United States Patent
Takahashi et al.

(10) Patent No.: US 9,520,603 B2
(45) Date of Patent: Dec. 13, 2016

(54) FUEL CELL SYSTEM

(71) Applicant: PANASONIC CORPORATION, Osaka (JP)

(72) Inventors: Manabu Takahashi, Shiga (JP); Motomichi Katou, Nara (JP); Masato Kihara, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 352 days.

(21) Appl. No.: 13/981,296

(22) PCT Filed: Jan. 10, 2013

(86) PCT No.: PCT/JP2013/000053
§ 371 (c)(1),
(2) Date: Jul. 23, 2013

(87) PCT Pub. No.: WO2013/145500
PCT Pub. Date: Oct. 3, 2013

(65) Prior Publication Data
US 2014/0248545 A1 Sep. 4, 2014

(30) Foreign Application Priority Data
Mar. 29, 2012 (JP) ................... 2012-075750

(51) Int. Cl.
H01M 8/04223 (2016.01)
H01M 8/0668 (2016.01)
(Continued)

(52) U.S. Cl.
CPC .......... *H01M 8/04223* (2013.01); *C01B 3/384* (2013.01); *H01M 8/04037* (2013.01);
(Continued)

(58) Field of Classification Search
CPC .............. H01M 8/04022; H01M 8/04059; H01M 8/04266; H01M 8/04738; H01M 8/0618; H01M 8/0668; H01M 8/0675
See application file for complete search history.

(56) References Cited

U.S. PATENT DOCUMENTS 4,046,956 A * 9/1977 Fanciullo ............. 429/412
2003/0124400 A1 7/2003 Hara et al.
(Continued)

FOREIGN PATENT DOCUMENTS

JP 2003-197231 A 7/2003
JP 2007-179886 A 7/2007
(Continued)

OTHER PUBLICATIONS

International Search Report issued in PCT/JP2013/000053, dated Feb. 12, 2013.
(Continued)

*Primary Examiner* — Ula C Ruddock
*Assistant Examiner* — Thomas Parsons
(74) *Attorney, Agent, or Firm* — McDermott Will & Emery LLP

(57) ABSTRACT

A fuel cell system (100) includes: a fuel cell (60); a fuel processor (41) including a reformer (43) and a CO reducer (44, 45); a combustor (42); a first air supply device (46); an electric heater (50); a power supply device (200); a power outage detector (11); and a controller (10). The controller is configured such that, in a power outage state where the power outage detector has detected the power outage before the fuel cell generates electric power, the controller performs at least one of: increasing a supply amount of the combustion air to be greater than in a power supplied state where the power outage detector does not detect the power outage; and decreasing a supply amount of the combustible gas to be less (Continued)

than in the power supplied state, and decreases an amount of heating by the electric heater.

11 Claims, 21 Drawing Sheets

(51) Int. Cl.
    *H01M 8/04* (2016.01)
    *H01M 8/06* (2016.01)
    *C01B 3/38* (2006.01)

(52) U.S. Cl.
    CPC ... *H01M 8/04373* (2013.01); *H01M 8/04604* (2013.01); *H01M 8/04664* (2013.01); *H01M 8/04738* (2013.01); *H01M 8/04776* (2013.01); *H01M 8/0618* (2013.01); *H01M 8/0668* (2013.01); *H01M 8/0675* (2013.01); *C01B 2203/0233* (2013.01); *C01B 2203/0283* (2013.01); *C01B 2203/044* (2013.01); *C01B 2203/047* (2013.01); *C01B 2203/066* (2013.01); *C01B 2203/085* (2013.01); *C01B 2203/0811* (2013.01); *C01B 2203/1619* (2013.01); *Y02E 60/50* (2013.01)

(56) References Cited

U.S. PATENT DOCUMENTS

| | | | |
|---|---|---|---|
| 2007/0065689 | A1 | 3/2007 | Edlund |
| 2008/0096068 | A1 | 4/2008 | Yamashita |
| 2012/0040256 | A1 | 2/2012 | Kani et al. |
| 2012/0178006 | A1 | 7/2012 | Kani et al. |

FOREIGN PATENT DOCUMENTS

| | | | | |
|---|---|---|---|---|
| JP | 2008-010178 | A | | 1/2008 |
| JP | 2008-081331 | A | | 4/2008 |
| JP | 2008081331 | | * | 4/2008 |
| JP | 2008-108484 | A | | 5/2008 |
| JP | 2009-249203 | A | | 10/2009 |
| JP | 2009249203 | | * | 10/2009 |
| JP | 2010-108807 | A | | 5/2010 |
| JP | 2011-251898 | A | | 12/2011 |
| JP | 2012-038559 | A | | 2/2012 |
| JP | 2012-056807 | A | | 3/2012 |

OTHER PUBLICATIONS

Extended European Search Report issued in European Applciation No. 13740198.0, dated Mar. 2, 2015.

* cited by examiner

FUEL CELL SYSTEM

RELATED APPLICATIONS

This application is the U.S. National Phase under 35 U.S.C. §371 of International Application No. PCT/JP2013/000053, filed on Jan. 10, 2013, which claims the benefit of Japanese Application No. 2012-075750, filed on Mar. 29, 2012, the disclosures of which Applications are incorporated by reference herein.

TECHNICAL FIELD

The present invention relates to a fuel cell system, and particularly to a fuel cell system configured to start up by using electric power from a system power supply and a power supply device.

BACKGROUND ART

In general, a fuel cell system receives electric power from a system power supply to which the fuel cell system is interconnected to, and drives a control device and accessory devices to heat up intended portions of the system by means of, for example, a combustor and an electric heater, thereby starting up and performing electric power generation by a fuel cell. In order to avoid a situation where the fuel cell system is unable to start up due to a power outage in which the power supply from the system power supply is stopped, an emergency-responsive fuel cell system disclosed in, for example, Patent Literature 1 includes a power generator and uses electric power from the power generator for the start-up when a power outage has occurred.

Moreover, in order to reduce electric power consumption at start-up, for example, a fuel cell system disclosed in Patent Literature 2 includes a burner and an electric heater, and when a power outage has occurred, the fuel cell system operates the burner without operating the electric heater. Accordingly, a hydrogen generator is heated solely by the burner, and electric power consumption by the electric heater is reduced.

CITATION LIST

Patent Literature

PTL 1: Japanese Laid-Open Patent Application Publication No. 2007-179886
PTL 2: Japanese Laid-Open Patent Application Publication No. 2012-38559

SUMMARY OF INVENTION

Technical Problem

However, in the fuel cell system disclosed in Patent Literature 2, when a power outage has occurred, it is difficult to heat up intended portions of the hydrogen generator to their respective suitable temperatures by heating the hydrogen generator solely with the burner. In one example, in the hydrogen generator, a reformer is provided at a position near the burner, and a shift converter and a selective oxidizer are provided at respective positions away from the burner. If these components are heated solely with the burner, the temperature of the reformer may become excessively high before the temperatures of the shift converter and the selective oxidizer reach their respective suitable temperatures, or the temperatures of the shift converter and the selective oxidizer may be too low when the temperature of the reformer has reached its suitable temperature.

As a result, if the reformer is heated excessively, hydrocarbon components contained in a gas supplied to the reformer are decomposed, and the decomposed carbon becomes deposited on a reforming catalyst, causing degradation of the reforming catalyst. Meanwhile, if the temperatures of the shift converter and the selective oxidizer do not reach their respective suitable temperatures, then carbon monoxide cannot be sufficiently removed from a reformed gas supplied to the fuel cell, causing degradation of the fuel cell due to the carbon monoxide remaining in the reformed gas.

In order to prevent such degradation of components, the hydrogen generator may be formed in such a shape as to allow intended portions of the hydrogen generator to be heated to their respective suitable temperatures. In this case, however, the shape of the hydrogen generator becomes complex, resulting in high cost.

The present invention has been made to solve the above-described problems. An object of the present invention is to provide a fuel cell system capable of reducing electric power consumption at start-up during a power outage while suppressing degradation of components and increase in costs.

Solution to Problem

A fuel cell system according to one aspect of the present invention is interconnected to a system power supply and includes: a fuel cell configured to generate electric power by causing a reaction between a fuel gas containing hydrogen and an oxidizing gas; a fuel processor including a reformer and a CO reducer, the reformer being configured to generate the fuel gas by causing a reaction between a raw material containing a hydrocarbon component and reforming water, the CO reducer being configured to reduce carbon monoxide in the fuel gas; a combustor configured to heat the fuel processor by combusting a combustible gas supplied to the combustor; a first air supply device configured to supply combustion air to the combustor; an electric heater configured to heat the CO reducer; a power supply device configured to supply electric power to the electric heater; a power outage detector configured to detect a power outage in which no electric power is supplied from the system power supply to the fuel cell system; and a controller. The controller is configured such that, in a power outage state where the power outage detector has detected the power outage before the fuel cell generates electric power, the controller performs at least one of: increasing a supply amount of the combustion air to be greater than in a power supplied state where the power outage detector does not detect the power outage; and decreasing a supply amount of the combustible gas to be less than in the power supplied state, and decreases an amount of heating by the electric heater.

Advantageous Effects of Invention

The present invention includes the above-described configuration, and advantageously provides a fuel cell system capable of reducing electric power consumption at start-up during a power outage while suppressing degradation of components and increase in costs.

The above object, other objects, features, and advantages of the present invention will be made clear by the following detailed description of preferred embodiments with reference to the accompanying drawings.

DESCRIPTION OF EMBODIMENTS

Figure 1:
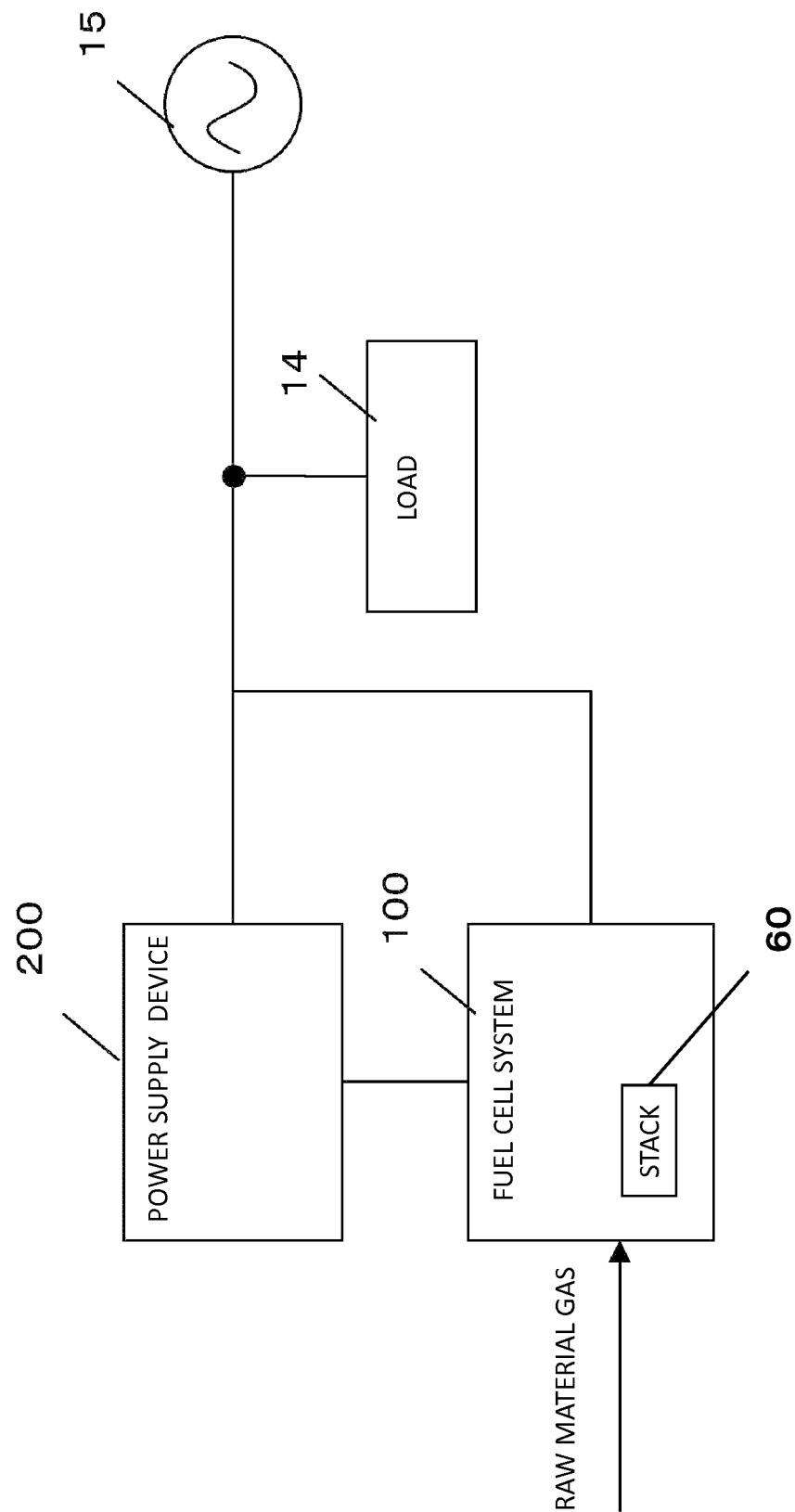
FIG. 1 is a block diagram schematically showing a fuel cell system according to Embodiment 1 of the present invention.

A fuel cell system according to a first aspect of the present invention is interconnected to a system power supply and includes: a fuel cell configured to generate electric power by causing a reaction between a fuel gas containing hydrogen and an oxidizing gas; a fuel processor including a reformer and a CO reducer, the reformer being configured to generate the fuel gas by causing a reaction between a raw material containing a hydrocarbon component and reforming water, the CO reducer being configured to reduce carbon monoxide in the fuel gas; a combustor configured to heat the fuel processor by combusting a combustible gas supplied to the combustor; a first air supply device configured to supply combustion air to the combustor; an electric heater configured to heat the CO reducer; a power supply device configured to supply electric power to the electric heater; a power outage detector configured to detect a power outage in which no electric power is supplied from the system power supply to the fuel cell system; and a controller. The controller is configured such that, in a power outage state where the power outage detector has detected the power outage before the fuel cell generates electric power, the controller performs at least one of: increasing a supply amount of the combustion air to be greater than in a power supplied state where the power outage detector does not detect the power outage; and decreasing a supply amount of the combustible gas to be less than in the power supplied state, and decreases an amount of heating by the electric heater.

A fuel cell system according to a second aspect of the present invention may be configured such that the fuel cell system according to the first aspect further includes a first temperature detector configured to detect a temperature of the reformer. The controller may be configured such that, if a first detected temperature detected by the first temperature detector is higher than or equal to a first predetermined temperature, the controller increases the supply amount of the combustion air or increases the amount of heating by the electric heater.

A fuel cell system according to a third aspect of the present invention may be configured such that the fuel cell system according to the first or second aspect further includes a second temperature detector configured to detect a temperature of the CO reducer. The controller may be configured such that, if a second detected temperature detected by the second temperature detector is lower than or equal to a second predetermined temperature, the controller increases the supply amount of the combustion air or increases the amount of heating by the electric heater.

A fuel cell system according to a fourth aspect of the present invention may be configured such that the fuel cell system according to any one of the first to third aspects further includes: a first temperature detector configured to detect a temperature of the reformer; and a second temperature detector configured to detect a temperature of the CO reducer. The controller may be configured such that, if a first detected temperature detected by the first temperature detector is higher than a second detected temperature detected by the second temperature detector, and a difference between the first detected temperature and the second detected temperature is greater than or equal to a third predetermined temperature, the controller performs at least one of: increasing the supply amount of the combustion air; decreasing the supply amount of the combustible gas; and increasing the amount of heating by the electric heater.

A fuel cell system according to a fifth aspect of the present invention may be configured such that, in the fuel cell system according any one of the first to fourth aspects, the controller is configured such that, if a time elapsed from when the combustor starts the combusting has reached a predetermined time, the controller increases the amount of heating by the electric heater.

A fuel cell system according to a sixth aspect of the present invention may be configured such that the fuel cell system according to any one of the first to fifth aspects further includes: a first temperature detector configured to detect a temperature of the reformer; a second temperature detector configured to detect a temperature of the CO reducer; a water supply device configured to supply the reforming water to the fuel processor; and an evaporator configured to perform heat exchange with the CO reducer to generate steam from the reforming water. The controller may be configured such that, if a second detected temperature detected by the second temperature detector is lower than a fourth predetermined temperature, the controller decreases a supply amount of the reforming water to be less than in the power supplied state.

A fuel cell system according to a seventh aspect of the present invention may be configured such that, in the fuel cell system according to the sixth aspect, the controller is configured such that, if the second detected temperature is higher than or equal to the fourth predetermined temperature, the controller increases the supply amount of the reforming water.

A fuel cell system according to an eighth aspect of the present invention may be configured such that, in the fuel cell system according to the sixth or seventh aspect, the controller is configured such that, if the second detected temperature is higher than or equal to the fourth predetermined temperature and a first detected temperature detected by the first temperature detector is higher than or equal to a fifth predetermined temperature, the controller brings the supply amount of the reforming water back to the supply amount of the reforming water in the power supplied state.

A fuel cell system according to a ninth aspect of the present invention may be configured such that, in the fuel cell system according to any one of the first to eighth aspects, the CO reducer includes: a shift converter configured to reduce carbon monoxide by reacting the carbon monoxide with water; and a selective oxidizer configured to reduce carbon monoxide by reacting the carbon monoxide with oxygen. The fuel cell system may further include a second air supply device configured to supply air to the selective oxidizer. The controller may be configured to cause the second air supply device to supply air such that the air supplied to the selective oxidizer is in an amount greater than in the power supplied state.

A fuel cell system according to a tenth aspect of the present invention may be configured such that the fuel cell system according to any one of the first to ninth aspects further includes: a first desulfurizer configured to remove sulfur from the raw material without reacting the sulfur contained in the raw material with hydrogen; and a second desulfurizer configured to remove sulfur from the raw material by reacting the sulfur contained in the raw material with hydrogen. The electric heater may heat the CO reducer and the second desulfurizer. The controller may be configured to increase a proportion of an amount of the sulfur removed by the first desulfurizer to an amount of the sulfur removed by the second desulfurizer as compared to the proportion in the power supplied state.

A fuel cell system according to an eleventh aspect of the present invention may be configured such that, in the fuel cell system according to any one of the first to tenth aspects, the fuel processor is configured such that a flue gas generated through the combusting by the combustor heats the CO reducer after heating the reformer.

Hereinafter, embodiments of the present invention are described in detail with reference to the accompanying drawings.

In the drawings, the same or corresponding components are denoted by the same reference signs, and a repetition of the same description is avoided.

Embodiment 1

FIG. 1 is a block diagram schematically showing a fuel cell system according to Embodiment 1. As shown in FIG. 1, a fuel cell system 100 is a system configured to generate electric power by causing a reaction between a fuel gas and an oxidizing gas, and generate hot water by utilizing exhaust heat that is generated when the electric power is generated. The fuel cell system 100 is connected to an electrical load 14, a system power supply 15, and a power supply device 200 by wiring. The fuel cell system 100 includes a fuel cell stack (fuel cell) 60, and supplies electric power generated by the fuel cell stack 60 to the electrical load 14 while interconnecting with the system power supply 15 and the power supply device 200. The electrical load 14 is an apparatus consuming electric power. The electrical load 14 is, for example, a household electrical appliance such as a refrigerator or television.

In a power generation step of the fuel cell system 100, the fuel cell system 100 generates electric power in a manner to follow the amount of electric power consumed by the electrical load 14, and supplies the electrical load 14 with electric power in an amount corresponding to the amount of electric power consumed by the electrical load 14. However, if the power consumption amount of the electrical load 14 is greater than the rated output of the fuel cell system 100, the fuel cell system 100 supplies electric power of the rated output to the electrical load 14, and the power supply device 200 or the system power supply 15 supplies electric power to the electrical load 14 to cover the shortfall.

In a start-up step of the fuel cell system 100, the fuel cell system 100 receives electric power supplied from the system power supply 15 or the power supply device 200, and drives accessory device, thereby preparing for electric power generation. In the start-up step, if the current state is a power outage state where the power supply from the system power supply 15 is stopped, then the fuel cell system 100 drives the accessory devices by using electric power from the power supply device 200. The power supply device 200 is a source of power supply different from the system power supply 15, and supplies electric power to the electrical load 14 and the fuel cell system 100. For example, a storage battery, solar cell, or gas engine power generator is used as the power supply device 200. If a storage battery is used as the power supply device 200, surplus power generated by the fuel cell system 100 can be stored in the power supply device 200.

Figure 2:
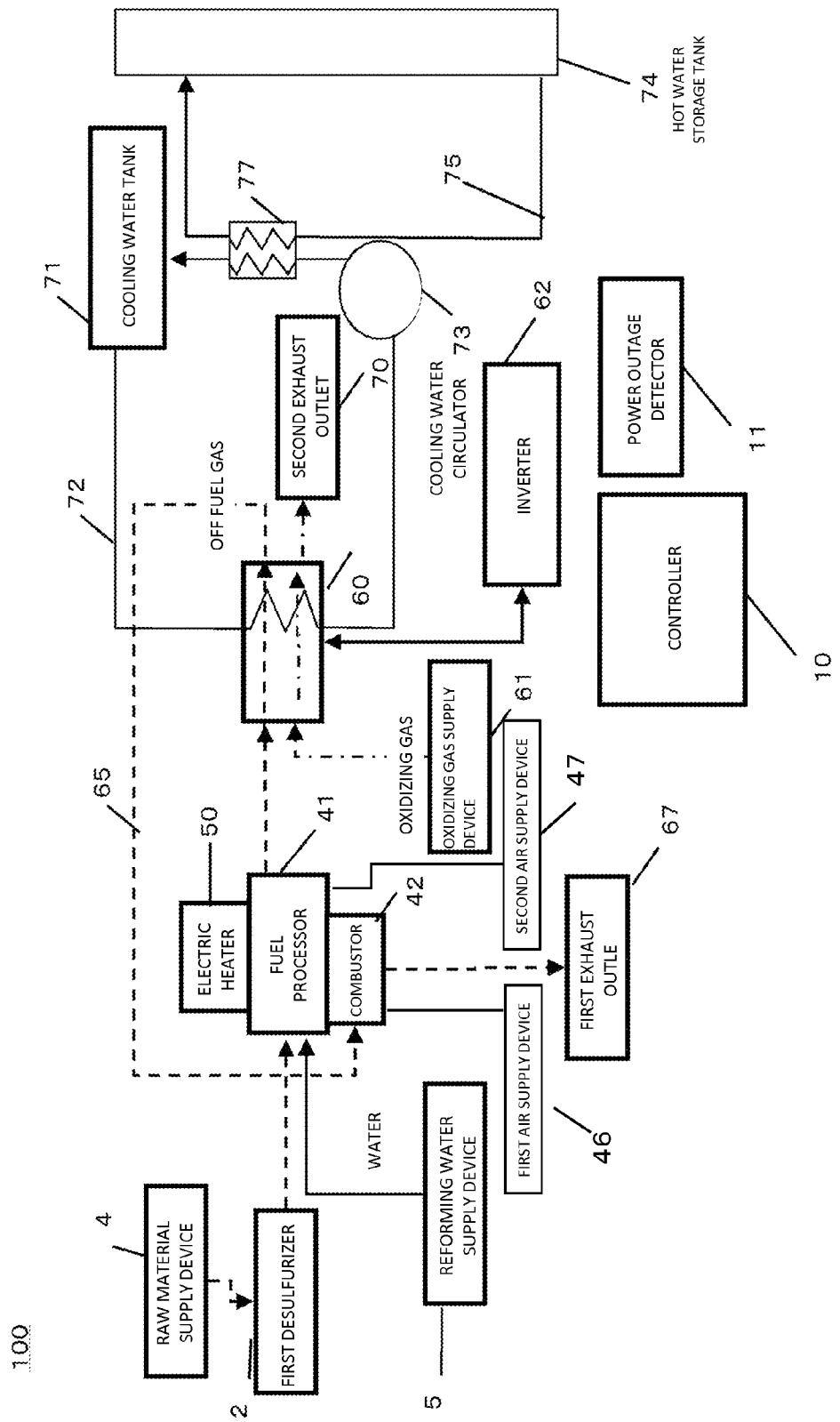
FIG. 2 is a block diagram showing a configuration of the fuel cell system of FIG. 1.

FIG. 2 is a block diagram showing a configuration of the fuel cell system. As shown in FIG. 2, the fuel cell system 100 includes the fuel cell stack 60. In the fuel cell stack 60, a fuel gas and an oxidizing gas electrochemically react with each other, and thereby DC power is generated. Wiring for outputting the generated electric power connects the fuel cell stack 60 to an inverter 62. The inverter 62 converts the DC power outputted from the fuel cell stack 60 into AC power having the same frequency as that of AC power of the system power supply 15 (FIG. 1). The inverter 62 is connected to wiring connected to the electrical load 14 (FIG. 1) and the power supply device 200 (FIG. 1), and supplies the AC power to the electrical load 14 and the power supply device 200 via the wiring.

The fuel cell stack 60 is a stack of a plurality of cells, and each cell includes an anode, a cathode, and a polymer electrolyte membrane interposed between the anode and the cathode. A separator is disposed between every adjacent cells. Channels are formed in the separator. The channels include: a fuel gas channel through which a fuel gas flows; an oxidizing gas channel through which an oxidizing gas flows; and part of a cooling water passage 72 through which cooling water circulates. The upstream end of the fuel gas channel is connected to a fuel gas supply passage, and the downstream end of the fuel gas channel is connected to a fuel gas discharge passage. The upstream end of the oxidizing gas channel is connected to an oxidizing gas supply passage, and the downstream end of the oxidizing gas channel is connected to an oxidizing gas discharge passage.

The fuel gas supply passage connects a fuel processor 41 and the fuel cell stack 60, and supplies a fuel gas from the fuel processor 41 to the fuel cell stack 60. The downstream end of a water supply passage and the downstream end of a raw material supply passage are connected to the fuel processor 41. The fuel processor 41 is supplied with water (reforming water) through the water supply passage and supplied with a raw material gas (raw material) through the raw material supply passage. The fuel processor 41 generates the fuel gas by causing a reforming reaction between the raw material gas and the reforming water in the presence of a reforming catalyst. The fuel gas is, for example, hydrogen necessary for an electrochemical reaction in the fuel cell stack 60. As described below, the fuel processor 41 includes CO reducers. A second air supply device 47 is connected to the fuel processor 41, and air (oxidation air) from the second air supply device 47 is supplied to the CO reducers included in the fuel processor 41. A combustor 42 and an electric heater 50 are disposed near the fuel processor 41. The fuel processor 41 is heated by the combustor 42 and the electric heater 50.

The water supply passage connects a reforming water supply device 5 and the fuel processor 41. The reforming water supply device 5 is a source of supply of the reforming water necessary for the reforming reaction in the fuel processor 41. The reforming water supply device 5 supplies the reforming water in a liquid state or gas state to the fuel processor 41 while adjusting the flow rate of the reforming water. Examples of the reforming water include: recovered water in the fuel cell system 100; ion-exchanged water that is ion-exchange treated and supplied from the outside of the system; and distilled water that is distillation treated.

The raw material supply passage connects a raw material supply device 4 and the fuel processor 41. A first desulfurizer 2 is provided on the raw material supply passage. The raw material supply device 4 is a source of supply of the raw material gas to the fuel processor 41, and adjusts the supply amount of the raw material gas. Examples of the raw material supply device 4 include city gas piping and a LPG (Liquefied Petroleum Gas) canister. The raw material gas is a gas or liquid containing a hydrocarbon necessary for the reforming reaction. Examples of the raw material gas include city gas containing methane and LPG containing propane. The first desulfurizer 2 removes sulfur components from the raw material gas.

The fuel cell stack 60 is connected to the combustor 42 via the fuel gas discharge passage, and an off fuel gas from the fuel cell stack 60 is supplied as a combustible gas through the fuel gas discharge passage. A first air supply device 46 is connected to the combustor 42. The first air supply device 46 supplies air (combustion air) to the combustor 42 while adjusting the supply amount of the air. As described below, the combustor 42 combusts the combustible gas and the combustion air, and supplies the resultant heat to the fuel processor 41. For example, a burner is used as the combustor 42. Examples of the off fuel gas include: the raw material gas that has not been reformed by the fuel processor 41; and the fuel gas that has not been used for the electrochemical reaction in the fuel cell stack 60. Although the off fuel gas is supplied to the combustor 42, an alternative configuration may be adopted, in which the raw material gas is directly supplied to the combustor 42. In addition, the first air supply device 46 may also serve as the second air supply device 47.

The upstream end of a flue gas passage is connected to the combustor 42, and the downstream end of the flue gas passage is connected to a first exhaust outlet 67. The first exhaust outlet 67 is provided at a casing that accommodates components of the fuel cell system 100. In the combustor 42, a flue gas, which is generated as a result of the combustible gas being combusted, is discharged to the outside of the casing through the first exhaust outlet 67.

A power supply passage is connected to the electric heater 50. Sources of power supply such as the fuel cell stack 60, the system power supply 15 (FIG. 1), and the power supply device 200 (FIG. 1) are connected to the power supply passage. The electric heater 50 receives electric power from the sources of power supply, and generates and supplies heat to the fuel processor 41. It should be noted that the power supply passage is connected not only to the electric heater 50 but also to other accessory devices. The accessory devices are driven by electric power from the sources of power supply. A power outage detector 11 is provided on the power supply passage connected to the system power supply 15. The power outage detector 11 measures electric power supplied from the system power supply 15 to the accessory devices including the electric heater 50, the voltage of the electric power, or the current of the electric power. Based on the measurement results, the power outage detector 11 detects a power outage state where electric power supply is stopped, and outputs power outage information indicative of the power outage state to a controller 10.

The oxidizing gas supply passage connects an oxidizing gas supply device 61 and the fuel cell stack 60. The oxidizing gas supply passage supplies air from the oxidizing gas supply device 61 to the fuel cell stack 60 as an oxidizing gas while adjusting the supply amount of the oxidizing gas. Examples of the oxidizing gas supply device 61 include a centrifugal pump, a reciprocating pump, and a scroll pump. It should be noted that, other than air, oxygen may be used as the oxidizing gas. In such a case, for example, an oxygen canister is used as the oxidizing gas supply device 61.

The oxidizing gas discharge passage connects the fuel cell stack 60 and a second exhaust outlet 70. The second exhaust outlet 70 is provided at the casing, which accommodates the components of the fuel cell system 100. An off oxidizing gas discharged from the fuel cell 60 is discharged into the atmosphere through the oxidizing gas discharge passage and the second exhaust outlet 70.

The cooling water passage 72 connects the fuel cell stack 60, a cooling water circulator 73, a heat exchanger 77, and a cooling water tank 71 in a manner to allow water (cooling water) to circulate through these components. The cooling water passage 72 and a hot storage water circulation passage 75 extend through the heat exchanger 77. The hot storage water circulation passage 75 connects the heat exchanger 77 and a hot water storage tank 74 in a manner to allow water (hot storage water) to circulate between the heat exchanger 77 and the hot water storage tank 74. By means of the cooling water circulator 73, the cooling water supplied from the cooling water tank 71 circulates through the cooling water passage 72, and absorbs heat from the fuel cell stack 60 during the circulation to become high-temperature cooling water. Then, the high-temperature cooling water reaches the heat exchanger 77. In the heat exchanger 77, heat is exchanged between the high-temperature cooling water in the cooling water passage 72 and low-temperature hot storage water in the hot storage water circulation passage 75. As a result, heat is taken from the cooling water. The resultant low-temperature cooling water flows through the cooling water passage 72 to return to the cooling water tank 71, and then flows toward the fuel cell stack 60 again. Meanwhile, the hot storage water becomes high-temperature water by obtaining heat through the heat exchange. The resultant high-temperature hot storage water flows through the hot storage water passage 75 into the hot water storage tank 74, and is stored therein.

The controller 10 is connected to the components of the fuel cell system 100 by signal wiring. The controller 10 controls the components by transmitting and receiving signals to and from the components. For example, the controller 10 controls accessory devices such as the raw material supply device 4, the oxidizing gas supply device 61, and the electric heater 50 so as to adjust the amount of combustion by the combustor 42 and the amount of heating by the electric heater 50 based on power outage information from the power outage detector 11. The controller 10 may be configured as a single controller performing centralized control, or may be configured as multiple controllers performing distributed control. The controller 10 may be any device, so long as the device realizes control functions. The controller 10 is configured as a microcomputer, processor, or logic circuit, for example.

In the power generation step, which will be described below, of the fuel cell system 100 with the above-described configuration, the raw material gas flows from the raw material supply device 4 into the first desulfurizer 2, and sulfur components are removed from the raw material gas in the first desulfurizer 2. The desulfurized raw material gas is supplied to the fuel processor 41 through the raw material gas supply passage, and the reforming water is supplied from the reforming water supply device 5 to the fuel processor 41 through the water supply passage. When the fuel processor 41 is heated by the electric heater 50 and the combustor 42 to a suitable temperature, the raw material gas is reformed with the reforming water in the fuel processor 41. As a result, a fuel gas is generated. The fuel gas is supplied to the fuel cell stack 60 through the fuel gas supply passage, and the oxidizing gas from the oxidizing gas supply device 61 is supplied to the fuel cell stack 60 through the oxidizing gas supply passage. In the fuel cell stack 60, the fuel gas and the oxidizing gas electrochemically react with each other, and thereby DC power is generated. The DC power is converted by the inverter 62 into AC power. The voltage of the AC power is raised, and then the AC power is supplied to the electrical load 14 (see FIG. 1). The electrical load 14, which is a household electrical load such as a television or washing machine operated by a user, uses the AC power. It should be noted that if the power supply device 200 (FIG. 1) is a storage battery, the electric power from the inverter 62 is supplied to the power supply device 200 and stored therein.

The off fuel gas discharged from the fuel gas channel of the fuel cell stack 60 flows through the fuel gas discharge passage, and is supplied to the combustor 42. The off fuel gas is combusted with the combustion air supplied from the first air supply device, and thereby heat is generated. The generated heat is supplied to the fuel processor 41. The off oxidizing gas discharged from the oxidizing gas channel of the fuel cell stack 60 is discharged to the atmosphere through the second exhaust outlet 70.

The cooling water flowing through the cooling water circulation passage 72 receives heat that is generated when electric power is generated by the fuel cell stack 60. The resultant high-temperature cooling water is circulated by the cooling water circulator 73 and reaches the heat exchanger 77. In the heat exchanger 77, the high-temperature cooling water exchanges heat with the hot storage water circulating through the hot storage water circulation passage 75, the hot storage water flowing from the hot water storage tank 74. The resultant heated hot storage water is stored in the hot water storage tank 74 as hot water. The hot water stored in the hot water storage tank 74 is used by a user in a bathroom or kitchen.

Figure 3:
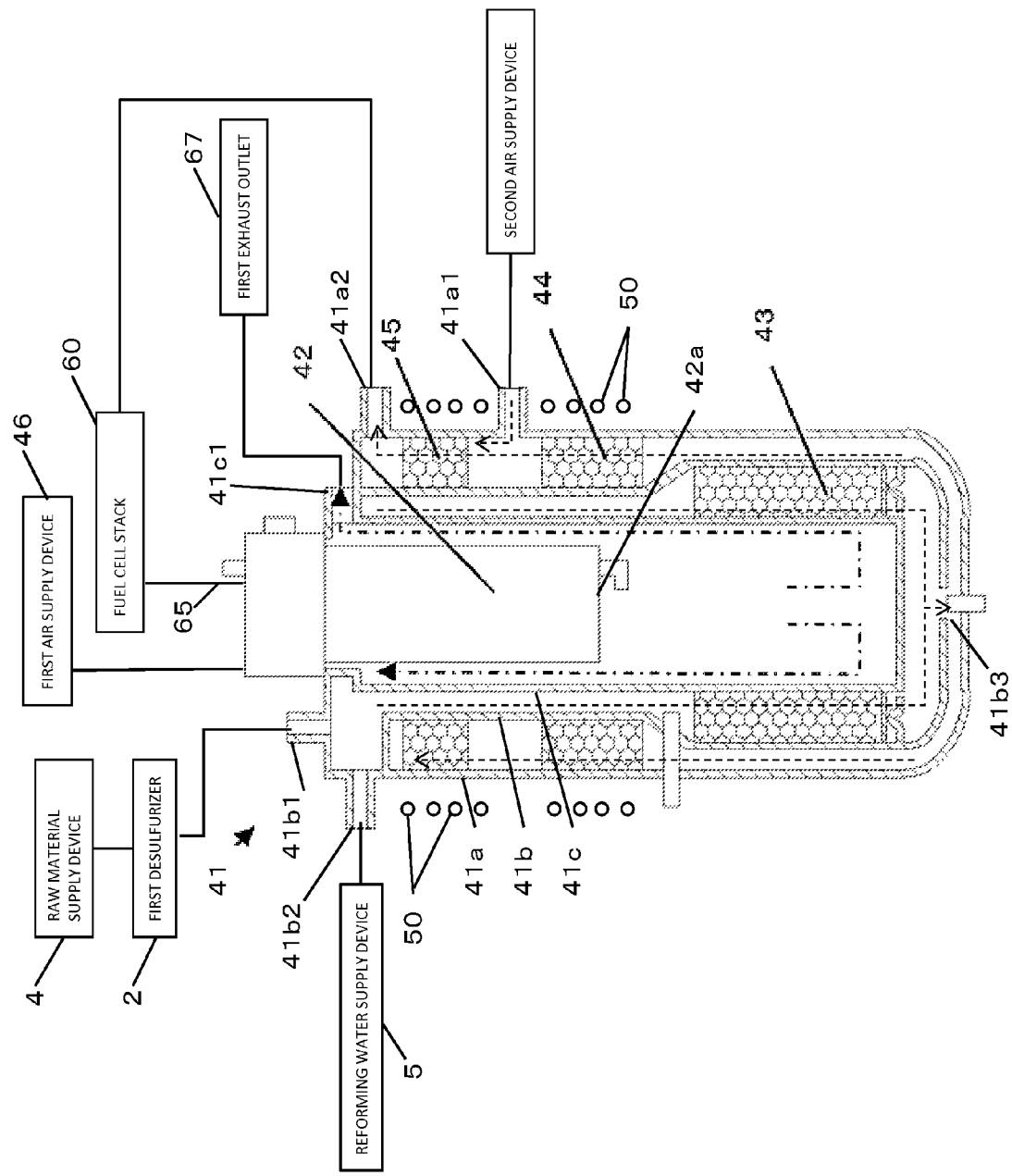
FIG. 3 is a cross-sectional view showing a fuel processor used in the fuel cell system of FIG. 2.

FIG. 3 is a cross-sectional view showing the fuel processor 41. As shown in FIG. 3, the fuel processor 41 includes a container 41a, an outer cylinder 41b positioned inside the container 41a, and an inner cylinder 41c positioned inside the outer cylinder 41b. The container 41a is formed by a substantially cylindrical side wall and a bottom portion. The bottom portion seals an opening at the lower end of the side wall. The container 41a is formed such that an opening at the upper end of the side wall between the side wall and the outer cylinder 41b is covered by a top portion. An oxidation air inlet 41a1 and a fuel gas outlet 41a2 are formed as openings in the side wall. The oxidation air inlet 41a1 is connected to the second air supply device 47, and the fuel gas outlet 41a2 is connected to the fuel cell stack 60 via the fuel gas supply passage.

The outer cylinder 41b is formed by: a substantially cylindrical side wall; a bottom portion sealing an opening at the lower end of the side wall; a larger-diameter portion provided at the upper part of the side wall; and a top portion covering an opening at the upper end of the larger-diameter portion. A raw material gas inlet 41b1 and a reforming water inlet 41b2 are formed as openings at the top portion of the outer cylinder 41b. A communication port 41b3 is formed as an opening in the bottom portion. The raw material supply device 4 is connected to the raw material gas inlet 41b1 by the raw material gas supply passage through the first desulfurizer 2. The reforming water supply device 5 is connected to the reforming water inlet 41b2 by the water supply passage.

The inner cylinder 41c is formed by a substantially cylindrical side wall and a bottom portion. The bottom portion seals an opening at the lower end of the side wall. A flue gas outlet 41c1 is formed as an opening in the side wall of the inner cylinder 41c, and an opening at the upper end of the side wall is sealed by the combustor 42. The first exhaust outlet 67 is connected to the flue gas outlet 41c1. An off fuel gas channel 65 is connected to the combustor 42. The off fuel gas discharged from the fuel cell stack 60 is supplied to the combustor 42 through the off fuel gas channel 65. The first air supply device 46 is connected to the combustor 42. The first air supply device 46 supplies the combustion air to the combustor 42. The combustor 42 extends downward. A jet-out port 42a is provided at the lower end of the combustor 42. It should be noted that an alternative configuration may be adopted, in which the combustor 42 is disposed outside the fuel processor 41.

The inner cylinder 41c is disposed inside the outer cylinder 41b, such that an inner gas flow passage is formed in cylindrical space between the outer cylinder 41b and the inner cylinder 41c. As indicated by dashed lines, the inner gas flow passage is a passage through which the raw material gas and the fuel gas flow from the raw material gas inlet 41b1 to the communication port 41b3. The upper part of the inner gas flow passage forms evaporation space where the raw material gas from the raw material gas inlet 41b1 and the reforming water from the reforming water inlet 41b2 are preheated. A reformer 43 is provided in the lower part of the inner gas flow passage. A reforming catalyst catalyzing a reforming reaction is accommodated in the reformer 43. The reformer 43 is disposed below the jet-out port 42a of the combustor 42 in such a manner as to surround a flame that is jetted out of the jet-out port 42a.

The outer cylinder 41b is disposed inside the container 41a, such that an outer gas flow passage is formed in cylindrical space between the container 41a and the outer cylinder 41b. The outer gas flow passage is a passage through which the fuel gas flows from the communication port 41b3 to the fuel gas outlet 41a2. In the outer gas flow passage, the fuel gas outlet 41a2 is provided more downstream than the oxidation air inlet 41a1. A shift converter 44 including a shift conversion catalyst catalyzing an aqueous shift reaction, and a selective oxidizer 45 including a selective oxidation catalyst catalyzing a selective oxidation reaction, are provided in the outer gas flow passage as the CO reducers. The shift converter 44 is disposed between the communication port 41b3 of the outer cylinder 41b and the oxidation air inlet 41a1 of the container 41a. The selective oxidizer 45 is disposed between the oxidation air inlet 41a1 and the fuel gas outlet 41a2 of the container 41a. The shift converter 44 and the selective oxidizer 45 are disposed above the reformer 43 in such a manner as to surround the combustor 42. The selective oxidizer 45 is disposed more downstream than the shift converter 44. The oxidation air inlet 41a1 is disposed between the shift converter 44 and the selective oxidizer 45. The electric heater 50 surrounds a portion of the container 41a, in which portion the shift converter 44 and the selective oxidizer 45 are disposed.

In the inner cylinder 41c of the fuel processor 41 with the above-described configuration, when the combustor 42 combusts the combustion air with the off fuel gas, a flame jets out of the jet-out port 42a. A high-temperature flue gas generated at the time flows from the jet-out port 42a toward the bottom portion of the inner cylinder 41c, hits the bottom portion of the inner cylinder 41c to turn around, flows upward along a flue gas flow passage indicated by dashed-dotted lines, and is then discharged through the flue gas outlet 41c1.

Then, the raw material gas from the raw material gas inlet 41b1 and the reforming water from the reforming water inlet 41b2 flow into the inner gas flow passage between the outer cylinder 41b and the inner cylinder 41c along dotted lines shown in FIG. 3. The raw material gas and the reforming water are preheated in the evaporation space by the flue gas. As a result, the reforming water becomes steam and flows into the reformer 43. In the reformer 43, the reforming catalyst is heated by heat transmitted from the flue gas to a suitable temperature at which the reforming catalyst functions favorably. For example, the suitable temperature is 550° C. or higher and preferably 600 to 650° C., to which the reforming catalyst is heated and thereby the reforming catalyst is activated. A steam reforming reaction occurs between the raw material gas and the reforming water in the presence of the reforming catalyst. As a result, a fuel gas containing hydrogen is generated. The fuel gas flows from the downstream end of the reformer 43 to the communication port 41b3 which is an opening formed in the bottom portion of the outer cylinder 41b.

The fuel gas flows through the communication port 41b3 into the outer gas flow passage between the container 41a and the outer cylinder 41b, and hits the bottom wall of the bottom portion of the container 41a to turn around. Then, the fuel gas flows to the shift converter 44 along dotted lines in FIG. 3. The shift conversion catalyst in the shift converter 44 is heated by heat from the flue gas flowing inside the inner cylinder 41c. When seen along the flue gas flow passage, the shift converter 44 is positioned downstream from the reformer 43 (see the dashed-dotted lines indicating the flow of the flue gas flow passage). The flue gas heats the reforming catalyst in the reformer 43 and then reaches the position of the shift converter 44. For this reason, when reaching the position of the shift converter 44, the temperature of the flue gas has been lowered. As a result, the shift conversion catalyst in the shift converter 44 is heated to a suitable temperature at which the shift conversion catalyst functions favorably. The suitable temperature is lower than the temperature of the reformer 43. For example, the suitable temperature is 180 to 300° C. and preferably 200° C., to which the shift conversion catalyst is heated and thereby the shift conversion catalyst is activated. It should be noted that the electric heater 50 is turned on as necessary, so that the shift conversion catalyst is heated by the electric heater 50. Then, a shift reaction between carbon monoxide and water occurs in the fuel gas while the fuel gas flows through the shift converter 44. As a result, carbon dioxide and hydrogen are generated, and carbon monoxide is removed from the fuel gas. The fuel gas, the carbon monoxide content of which has been reduced, flows out to an air mixed part between the shift converter 44 and the selective oxidizer 45.

Not only the fuel gas but also the oxidation air from the oxidation air inlet 41a1 flow into the air mixed part 25, in which the fuel gas and the oxidation air are mixed together. The mixture of the fuel gas and the oxidation air flows into the selective oxidizer 45. The selective oxidation catalyst in the selective oxidizer 45 is heated by heat from the flue gas. At the time, the temperature of the flue gas heating the selective oxidizer 45 has been lowered since, when seen along the flue gas flow passage, the selective oxidizer 45 is positioned downstream from the shift converter 44 (see the dashed-dotted lines). As a result, the selective oxidation catalyst in the selective oxidizer 45 is heated to a suitable temperature at which the selective oxidation catalyst functions favorably. The suitable temperature is lower than the temperature of the shift converter 44. For example, the suitable temperature is 100 to 180° C. and preferably 170° C., to which the selective oxidation catalyst is heated and thereby the selective oxidation catalyst is activated. It should be noted that the electric heater 50 is turned on as necessary, so that the selective oxidation catalyst is heated by the electric heater 50. Then, carbon monoxide in the fuel gas reacts with oxygen in the oxidation air while the fuel gas flows through the shift converter 44. As a result, the carbon monoxide concentration in the fuel gas is reduced to several ppm. The fuel gas, from which carbon monoxide has been thus removed, flows out of the fuel gas outlet 41a2, and is supplied to the fuel cell stack 60 through the fuel gas supply passage.

Figure 4:
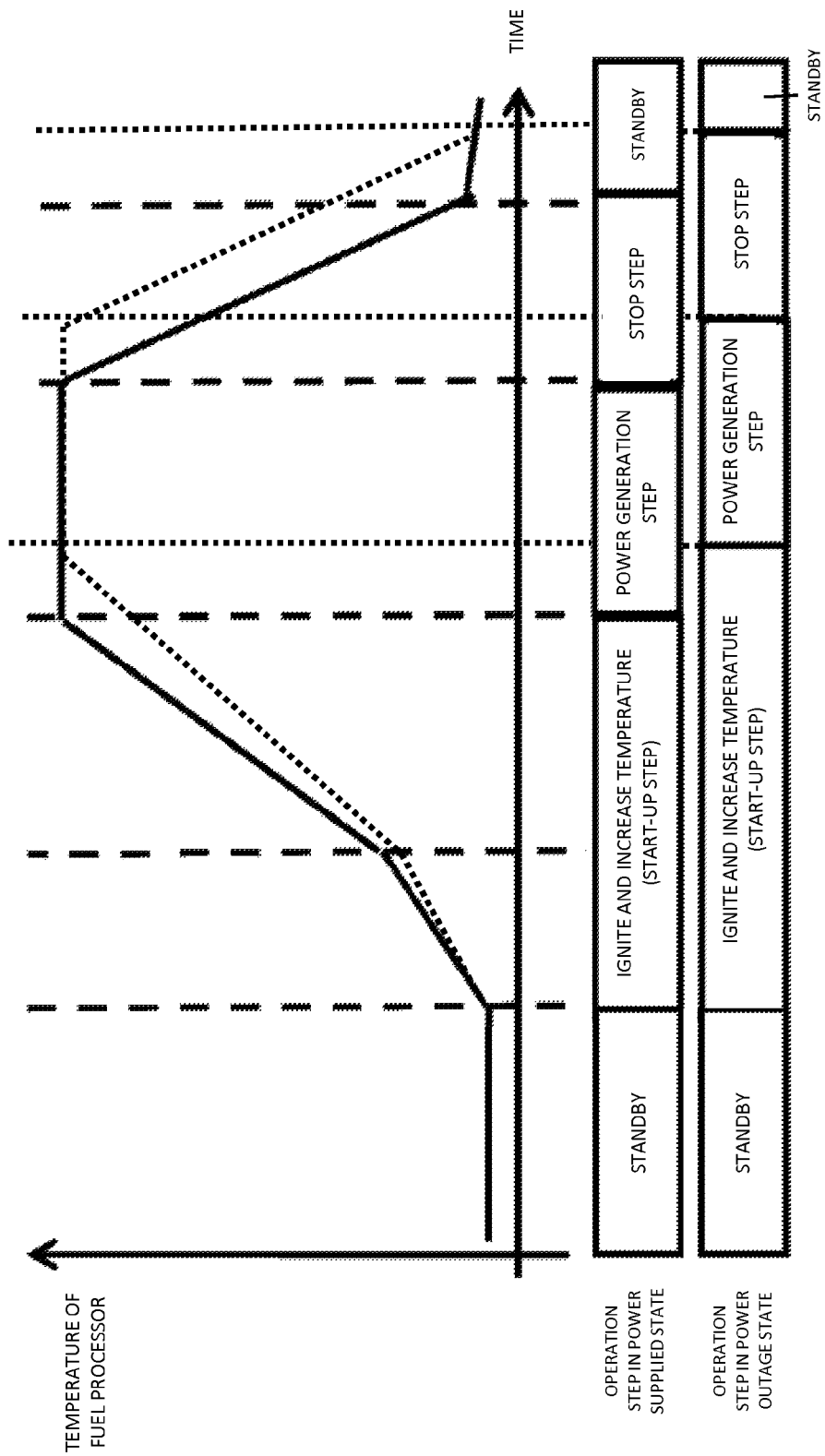
FIG. 4 is a graph schematically showing a relationship between each operation step of the fuel cell system of FIG. 2 and the temperature of the fuel processor.

Next, operations (operation method) of the above-described fuel cell system 100 are described. FIG. 4 is a graph schematically showing a relationship between each operation step of the fuel cell system 100 and the temperature of the fuel processor 41. The vertical axis of the graph represents the temperature of the fuel processor 41 (i.e., the temperature of a suitable portion representing the fuel processor 41), and the horizontal axis of the graph represents time. The time corresponds to operation steps (a standby step, a start-up step, a power generation step, and a stop step) in a power supplied state and a power outage state. A solid line in the graph indicates the temperature of the fuel processor 41 in the power supplied state, and a dotted line in the graph indicates the temperature of the fuel processor 41 in the power outage state. The power supplied state is a state where electric power is supplied from the system power supply 15 to the fuel cell system 100. It should be noted that, among the operation steps, the start-up step in the power supplied state, and the stop step and the standby step in both the power supplied state and the power outage state, are the same as those of the conventional art. Therefore, a description of these steps is omitted.

As shown in FIG. 4, in the fuel cell system 100, the start-up step, which is a step of preparing for electric power generation by the fuel cell stack 60, is performed when a start-up instruction is outputted to the controller 10 as a result of a user operating a remote controller or an operating unit of the body of the fuel cell system 100. In the start-up step in the power supplied state, the fuel processor 41 is heated by the combustor 42 and the electric heater 50, so that the temperature of the fuel processor 41 increases as indicated by the solid line in the graph. Meanwhile, in the start-up step in the power outage state, as described below, the combustor 42 is operated first, and then the electric heater 50 is operated as necessary. Accordingly, as indicated by the dotted line in the graph, the temperature increase rate of the fuel processor 41 is lower than in the power supplied state. As a result, the period of the start-up step in the power outage state is longer than the period of the start-up step in the power supplied state.

When the temperature of the fuel processor 41 reaches a predetermined temperature and predetermined power generation conditions for enabling the fuel cell stack 60 to generate electric power are satisfied, the power generation step is performed. In the power generation step, the temperature is maintained so that the temperatures of the catalysts in the respective components 43 to 45 of the fuel processor 41 will be such suitable temperatures as described above.

The stop step, which is a step of stopping the electric power generation by the fuel cell stack 60, is performed when a stop instruction is outputted to the controller 10 as a result of the user operating the operating unit of the fuel cell system 100 again. Consequently, the heating by the combustor 42 and the electric heater 50 is stopped, and the temperature of the fuel processor 41 drops. Then, the operation enters the standby step between the stop step and the start-up step.

Figure 5:
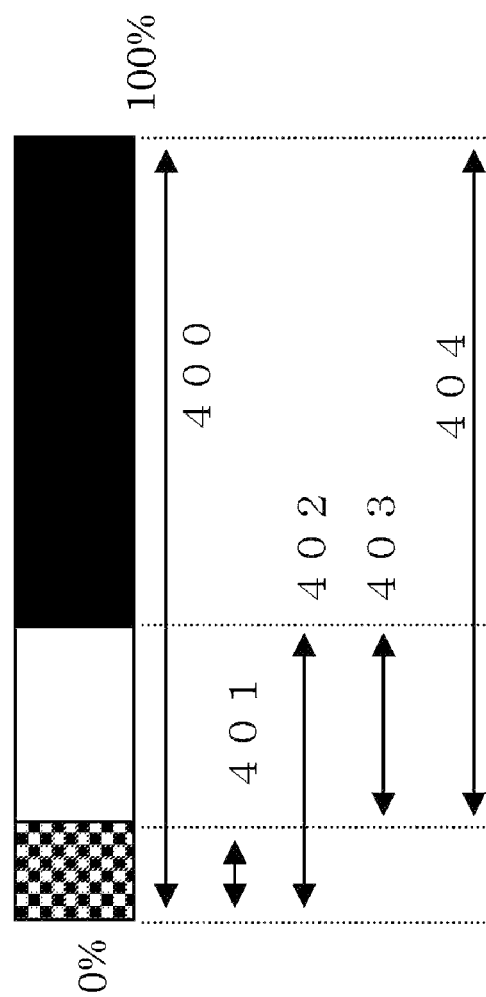
FIG. 5 is a graph showing the power rate of a power supply device shown in FIG. 1.

Electric power outputted in the power generation step is supplied to the electrical load 14 (FIG. 1). Residual electric power that has not been supplied to the electrical load 14 is, for example, stored in the power supply device 200 in a case where a storage battery is used as the power supply device 200 (FIG. 1). FIG. 5 is a graph showing the power rate of a storage battery serving as the power supply device 200. As indicated by an arrow 400 of FIG. 5, the power supply device 200 is capable of storing 0 to 100% of electric power. In the case of FIG. 5, for example, electric power of a rate indicated by an arrow 402 (i.e., power 402) remains in the power supply device 200. Here, if a power outage state has occurred, electric power is not supplied from the system power supply 15 to the fuel cell system 100. Accordingly, the fuel cell system 100 starts up by using electric power supplied from the power supply device 200. Of the power 402 remaining in the power supply device 200, electric power of a rate indicated by an arrow 401 (i.e., power 401) is electric power necessary for the start-up of the fuel cell system 100.

Thus, if the power 402 is greater than the power 401, the fuel cell system 100 can start up by using electric power supplied from the power supply device 200. Even after the power 401 is used for the start-up, electric power of a rate indicated by an arrow 403 (i.e., power 403) remains. The power 403 can be used for other purposes. Since the amount of electric power available during a power outage is small, it is desired that the remaining power 403 be great. If the power 402 is less than the power 401, the fuel cell system 100 is unable to start up by using electric power supplied from the power supply device 200. Therefore, the less the power 401, the more likely the situation of being unable to start up can be avoided. Thus, in either case, it is desirable to reduce the power 401 which is necessary for the start-up during a power outage. Electric power used by the electric heater accounts for a large portion of the power 401. Therefore, the usage ratio between the combustor 42 and the electric heater 50 is adjusted in accordance with a process described below, and thereby the amount of power 401 necessary for starting up can be reduced during a start-up being performed.

It should be noted that either the start-up step for the power outage state or the start-up step for the power supplied state can be selectively performed in accordance with the power 402 stored in the power supply device 200. For example, in a case where the power 402 is greater than the power 401 necessary for a start-up, even if the current state is the power outage state, the fuel cell system 100 may be started up in accordance with the start-up step for the power supplied state.

Figure 6:
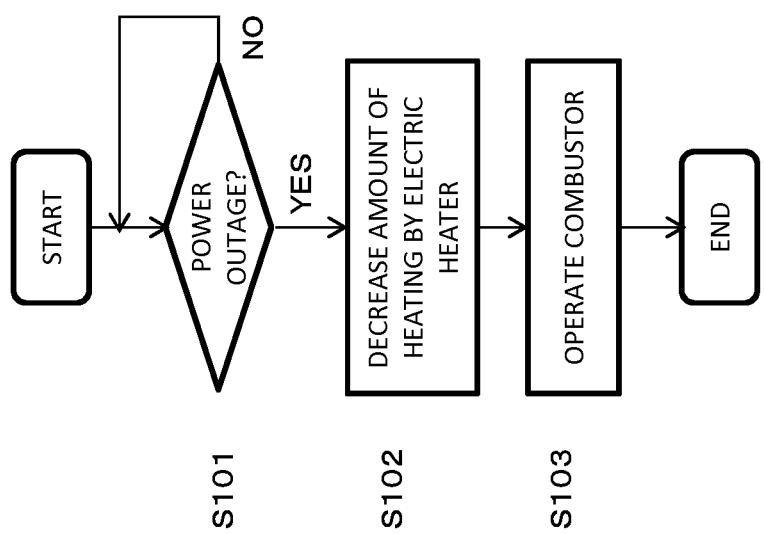
FIG. 6 is a flowchart showing an example of a start-up step performed by the fuel cell system of FIG. 2 in a power outage state.

FIG. 6 is a flowchart showing an example of the start-up step performed by the fuel cell system 100 in the power outage state. As shown in FIG. 6, in the start-up step at the beginning and during a start-up, first, the controller 10 determines whether the current state is the power outage state (step S101). While no power outage information is being inputted from the power outage detector 11 (step S101: NO), the controller 10 determines that the current state is the power supplied state where the power outage detector 11 does not detect a power outage. In the power supplied state, electric power is supplied from the system power supply 15 to the fuel cell system 100. Accordingly, the controller 10 performs a normal start-up step in which the fuel processor 41 is heated by the combustor 42 and the electric heater 50.

On the other hand, if there is an input of power outage information from the power outage detector 11, the controller 10 determines that the current state is the power outage state (step S101: YES). The controller 10 decreases the amount of heating by the electric heater 50 to be less than in the power supplied state (step S102). The definition of decreasing the amount of heating by the electric heater 50 includes: stopping the electric heater 50; and decreasing the amount of heat generated by the electric heater 50 (or decreasing the amount of electric power consumed by the electric heater 50) to be less than in the power supplied state. That is, in the power outage state, the electric heater 50 may be stopped or may be operated. However, in a case where the electric heater 50 is being operated, the controller 10 decreases the amount of heating by the electric heater 50 to be less than in the power supplied state, thereby decreasing the amount of electric power consumed by the electric heater 50 to be less than in the power supplied state.

The controller 10 operates the combustor 42 while increasing the amount of combustion air supplied from the first air supply device 46 to be greater than in the power supplied state (step S103). At the time, the controller 10 may increase the amount of off fuel gas (combustible gas) supplied to the combustor 42 via the fuel cell stack 60, by increasing the amount of raw material gas supplied from the raw material supply device 4 to be greater than in the power supplied state. As a result, the amount of heat generated by the combustor 42 increases, and the temperature of the flue gas heated by the combustor 42 increases. The resultant high-temperature flue gas heats the reforming catalyst in the reformer 43, the shift conversion catalyst in the shift converter 44, and the selective oxidation catalyst in the selective oxidizer 45 sequentially in said order. At the time, the amount of flue gas is great, and therefore, the amount of heat supplied from the off fuel gas to the shift conversion catalyst and the selective oxidation catalyst is also great. As a result, even with a small amount of heating by the electric heater 50, the catalysts in the fuel processor 41 can be heated to their respective suitable temperatures without requiring the fuel processor 41 to have a complex shape. Consequently, the catalysts sufficiently exert their respective functions, and thereby degradation of the fuel cell system 100 can be prevented while increase in electric power consumption and cost is suppressed.

The series of operations (in steps S101 to S103) is performed repeatedly at predetermined intervals. As necessary or when the temperatures of the catalysts have reached their respective suitable temperatures, the controller 10 operates the reforming water supply device 5, and/or operates the electric heater 50 while decreasing the amount of heating by the combustor 42. As a result, a fuel gas is generated by the reformer 43 in the fuel processor 41, and carbon monoxide is removed from the fuel gas in the shift converter 44 and the selective oxidizer 45. Then, the fuel gas is supplied to the fuel cell stack 60. When the oxidizing gas supply device 61 is operated and the predetermined power generation conditions are satisfied, the operation advances from the start-up step to the power generation step.

It should be noted that when the supply amount of the combustion air is increased (in step S103), it is not necessary to increase the supply amount of the off fuel gas (combustible gas). By not increasing the supply amount of the off fuel gas, overheating of the reforming catalyst positioned at the upstream side of the flue gas flow passage can be prevented although the period of the heating by the flue gas is lengthened since the temperature of the flue gas is lower in this case. Moreover, since the amount of flue gas increases, the shift conversion catalyst and selective oxidation catalyst positioned at the downstream side of the flue gas flow passage can also be heated sufficiently by the flue gas. Therefore, the temperatures of the catalysts in the fuel processor 41 can be adjusted to their respective suitable temperatures.

(Variation 1)

In the fuel cell system 100 according to Variation 1 of Embodiment 1, when the combustor 42 is operated (step S103), the amount of combustible gas supplied to the combustor 42 is decreased to be less than in the power supplied state. As a result, the amount of heat generated by the combustor 42 decreases, and the temperature of the flue gas becomes lower than in the power supplied state. This prevents the temperature of the reforming catalyst positioned at the upstream side of the flue gas flow passage from becoming excessively high. As time elapses, the temperatures of the reforming catalyst, the shift conversion catalyst, and the selective oxidation catalyst increase and reach their respective suitable temperatures. Consequently, the catalysts exert their respective functions even with a decreased amount of heating by the electric heater 50, and thereby degradation of the fuel cell system 100 can be avoided.

(Variation 2)

Figure 7:
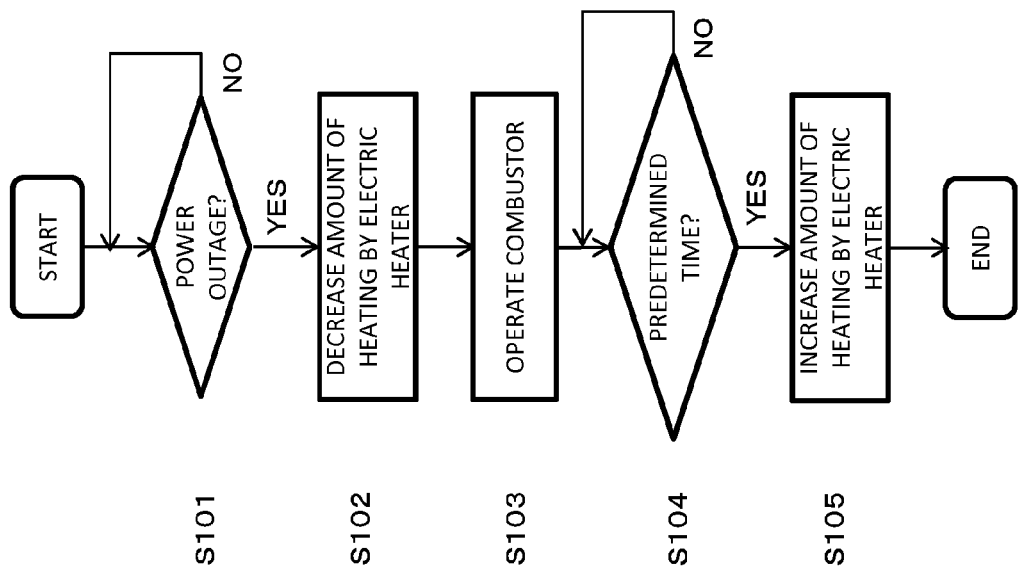
FIG. 7 is a flowchart showing an example of the start-up step performed by a fuel cell system according to Variation 1 of Embodiment 1 of the present invention in the power outage state.

FIG. 7 is a flowchart showing an example of the start-up step performed by the fuel cell system 100 according to Variation 2 of Embodiment 1 in the power outage state. As shown in FIG. 7, the combustor 42 is operated while the amount of combustion air supplied to the combustor 42 is increased to be greater than in the power supplied state or the amount of combustible gas supplied to the combustor 42 is decreased to be less than in the power supplied state (step S103). The catalysts are heated by the flue gas heated by the combustor 42. In this case, however, the temperatures of the shift conversion catalyst and selective oxidation catalyst positioned at the downstream side of the flue gas flow passage are less easily increased than the temperature of the reforming catalyst positioned at the upstream side of the flue gas flow passage. For this reason, when a time elapsed from the start of the combustion by the combustor 42 has reached a predetermined time (step S104: YES), the amount of heating by the electric heater 50 is increased (step S105). The definition of increasing the amount of heating by the electric heater 50 includes: causing the electric heater 50 to start operating from a stop state; and increasing the amount of heating by the electric heater 50, which has previously been decreased in step S102 to be less than in the power supplied state.

As a result, the shift conversion catalyst and the selective oxidation catalyst, whose temperature increase has been slower than the temperature increase of the reforming catalyst, are heated by the electric heater 50. Consequently, the temperatures of the catalysts in the fuel processor 41 are adjusted to their respective suitable temperatures. This allows the catalysts to exert their respective functions, and thereby degradation of the fuel cell system 100 can be prevented. Moreover, reduction in electric power consumption is realized since the amount of heating by the electric heater 50 is in a decreased state until the time elapsed from the start of the combustion by the combustor 42 has reached the predetermined time.

(Variation 3)

Figure 8:
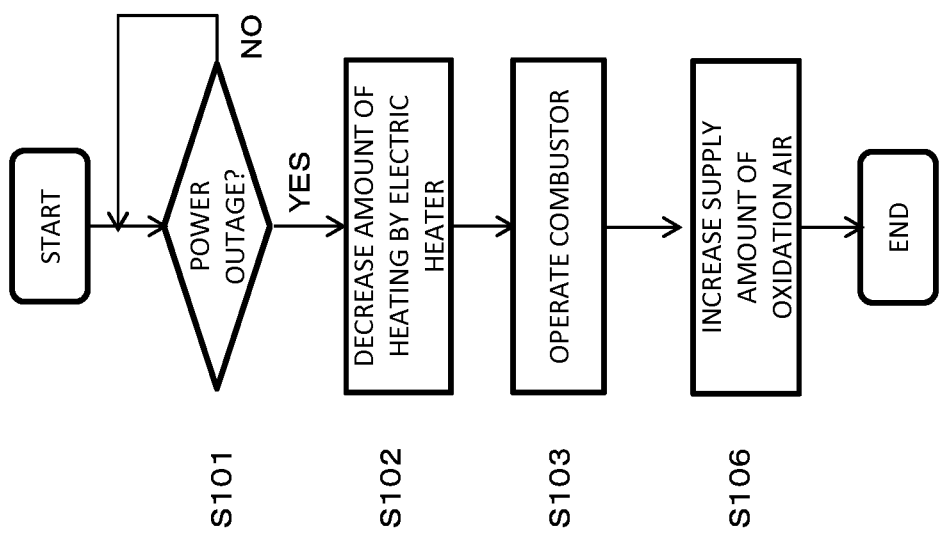
FIG. 8 is a flowchart showing an example of the start-up step performed by a fuel cell system according to Variation 3 of Embodiment 1 of the present invention in the power outage state.

FIG. 8 is a flowchart showing an example of the start-up step performed by the fuel cell system 100 according to Variation 3 of Embodiment 1 in the power outage state. As shown in FIG. 8, the combustor 42 is operated while the amount of combustion air supplied to the combustor 42 is increased to be greater than in the power supplied state or the amount of combustible gas supplied to the combustor 42 is decreased to be less than in the power supplied state (step S103). The catalysts are heated by the flue gas heated by the combustor 42. In this case, however, the temperatures of the shift conversion catalyst and selective oxidation catalyst positioned at the downstream side of the flue gas flow passage are less easily increased than the temperature of the reforming catalyst positioned at the upstream side of the flue gas flow passage. For this reason, the controller 10 controls the second air supply device 47 to increase the amount of air supplied to the selective oxidizer 45 to be greater than in the power supplied state (step S106). As a result, a selective oxidation reaction, which is an exothermic reaction, actively occurs in the selective oxidizer 45. Heat generated due to the reaction causes the temperature of the selective oxidation catalyst in the selective oxidizer 45 to increase. Consequently, the temperatures of the catalysts in the fuel processor 41 are adjusted to their respective suitable temperatures, and a fuel gas with reduced carbon monoxide content can be generated.

Embodiment 2

Figure 9:
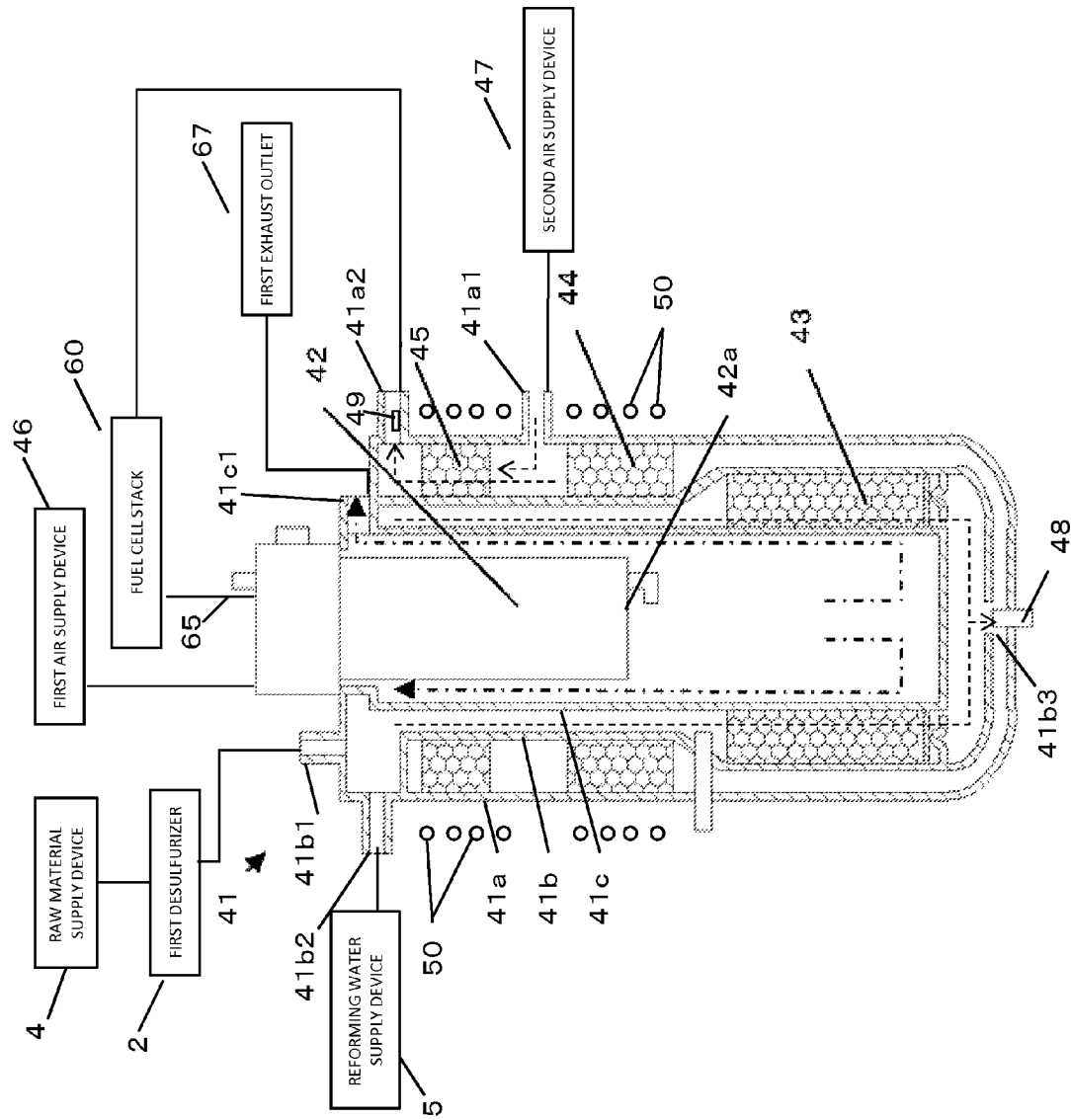
FIG. 9 is a cross-sectional view showing a fuel processor used in a fuel cell system according to Embodiment 2 of the present invention.

FIG. 9 is a cross-sectional view showing the fuel processor 41 used in the fuel cell system 100 according to Embodiment 2. As shown in FIG. 9, the fuel processor 41 further includes: a first temperature detector 48 configured to detect the temperature of the reformer 43; and a second temperature detector 49 configured to detect the temperature of the CO reducers (shift converter 44, selective oxidizer 45). It should be noted that only the first temperature detector 48 may be used and the second temperature detector 49 need not be provided. Alternatively, only the second temperature detector 49 may be used and the first temperature detector 48 need not be provided.

The first temperature detector 48 is disposed at the center of the bottom portion of the container 41a below the reformer 43 in a manner to face the communication port 41b3. The first temperature detector 48 detects the temperature of the fuel gas that has flowed through the reformer 43, and outputs the detected temperature to the controller 10 as the temperature of the reforming catalyst in the reformer 43. It should be noted that the position of the first temperature detector 48 is not limited to a position below the reformer 43, but may be a position above or inside the reformer 43. As an alternative, the first temperature detector 48 may be provided within the reforming catalyst.

The second temperature detector 49 is disposed at the fuel gas outlet 41a2 above the selective oxidizer 45. The second temperature detector 49 detects the temperature of the fuel gas that has flowed through the selective oxidizer 45, and outputs the detected temperature to the controller 10 as the temperature of the catalysts in the CO reducers 44 and 45. It should be noted that the position of the second temperature detector 49 is not limited to a position above the selective oxidizer 45, but may be a position inside or below the selective oxidizer 45. As an alternative, the second temperature detector 49 may be provided within the selective oxidation catalyst. As yet another alternative, the second temperature detector 49 may be provided above, inside, or below the shift converter 44. As yet another alternative, the second temperature detector 49 may be provided within the shift conversion catalyst.

Figure 10:
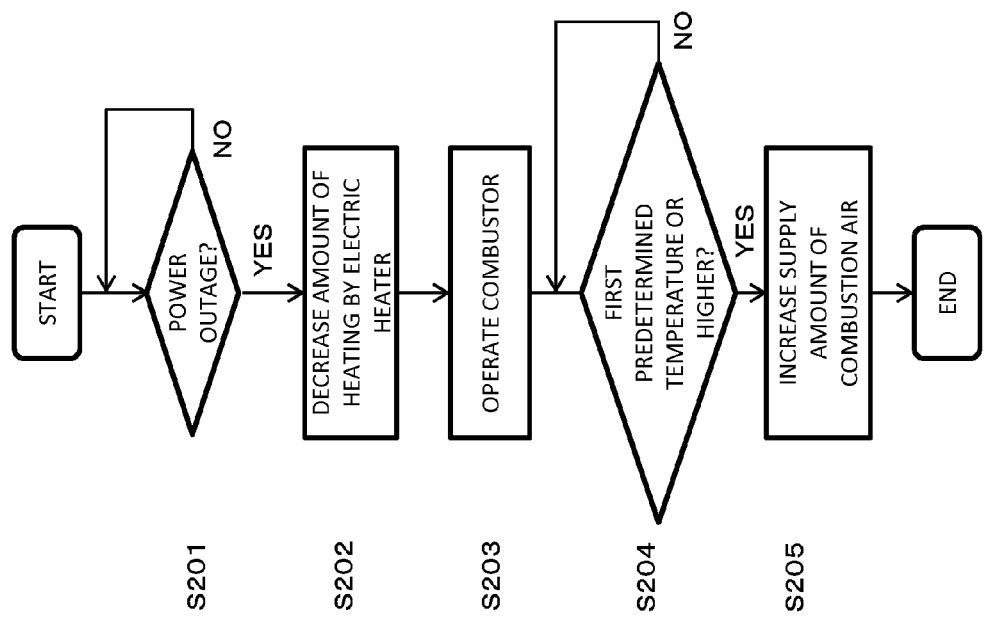
FIG. 10 is a flowchart showing an example of the start-up step performed by the fuel cell system of FIG. 9 in the power outage state.

FIG. 10 is a flowchart showing an example of the start-up step performed by the fuel cell system 100 in the power outage state. It should be noted that processes in steps S201 to S203 of FIG. 10 are the same as the processes in steps S101 to S103 of FIG. 6, respectively. Therefore, the processes in steps S201 to S203 will be described briefly.

As shown in FIG. 10, in the power outage state (step S201: YES), the controller 10 decreases the amount of heating by the electric heater 50 to be less than in the power supplied state (step S202). Then, the combustor 42 is operated while the amount of combustion air supplied to the combustor 42 is increased to be greater than in the power supplied state or the amount of combustible gas supplied to the combustor 42 is decreased to be less than in the power supplied state (step S203). The catalysts are heated by the flue gas generated by the combustor 42. In this case, however, the temperature of the reforming catalyst positioned at the upstream side of the flue gas flow passage is more easily increased than the temperatures of the shift conversion catalyst and selective oxidation catalyst positioned at the downstream side of the flue gas flow passage. Therefore, the controller 10 determines whether or not a first detected temperature detected by the first temperature detector 48 is higher than or equal to a first predetermined temperature (step S203). The first predetermined temperature is in advance set to a suitable temperature for the reforming catalyst, for example, 550° C. or higher, and preferably 600 to 650° C.

If the first detected temperature is higher than or equal to the first predetermined temperature (step S204: YES), the controller 10 controls the first air supply device 46 to increase the supply amount of the combustion air (step S205). When the combustor 42 is operated in step S203, if the supply amount of the combustion air is increased to be greater than in the power supplied state, then the controller 10 controls the first air supply device 46 in step S205 to further increase the increased supply amount of the combustion air. Alternatively, when the combustor 42 is operated in step S203, if the supply amount of the combustion air is increased to be greater than in the power supplied state, then the controller 10 controls the first air supply device 46 in step S205 such that the supply amount of the combustion air is greater than in the power supplied state.

As a result, the amount and flow velocity of the flue gas are increased. This makes it possible to prevent overheating of the reforming catalyst positioned at the upstream side of the flue gas flow passage, and to deliver heat by means of the flue gas to the shift conversion catalyst and selective oxidation catalyst positioned at the downstream side of the flue gas flow passage. Consequently, the temperatures of the catalysts in the fuel processor 41 can be adjusted to their respective suitable temperatures.

(Variation 1)

Figure 11:
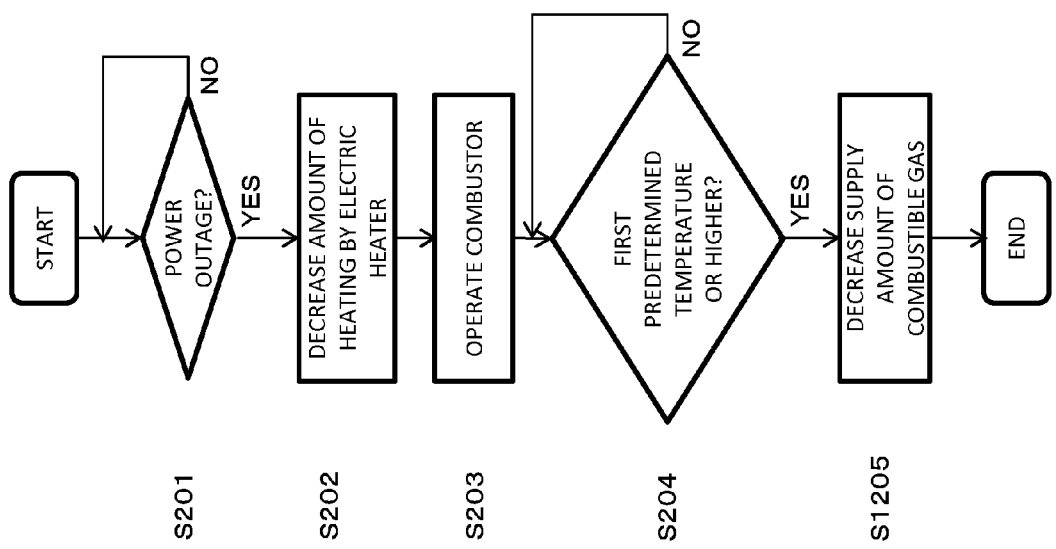
FIG. 11 is a flowchart showing an example of the start-up step performed by a fuel cell system according to Variation 1 of Embodiment 2 of the present invention in the power outage state.

FIG. 11 is a flowchart showing an example of the start-up step performed by the fuel cell system 100 according to Variation 1 of Embodiment 2 in the power outage state. As shown in FIG. 11, if the first detected temperature is higher than or equal to the first predetermined temperature (step S204: YES), it means that the temperature of the reforming catalyst has reached a suitable temperature. Accordingly, the controller 10 increases the amount of heating by the electric heater 50 (step S1204). As a result, the temperatures of the shift conversion catalyst and the selective oxidation catalyst are increased. In this manner, not only the temperature of the reforming catalyst but also the temperatures of the shift conversion catalyst and the selective oxidation catalyst are allowed to reach their respective suitable temperatures.

(Variation 2)

Figure 12:
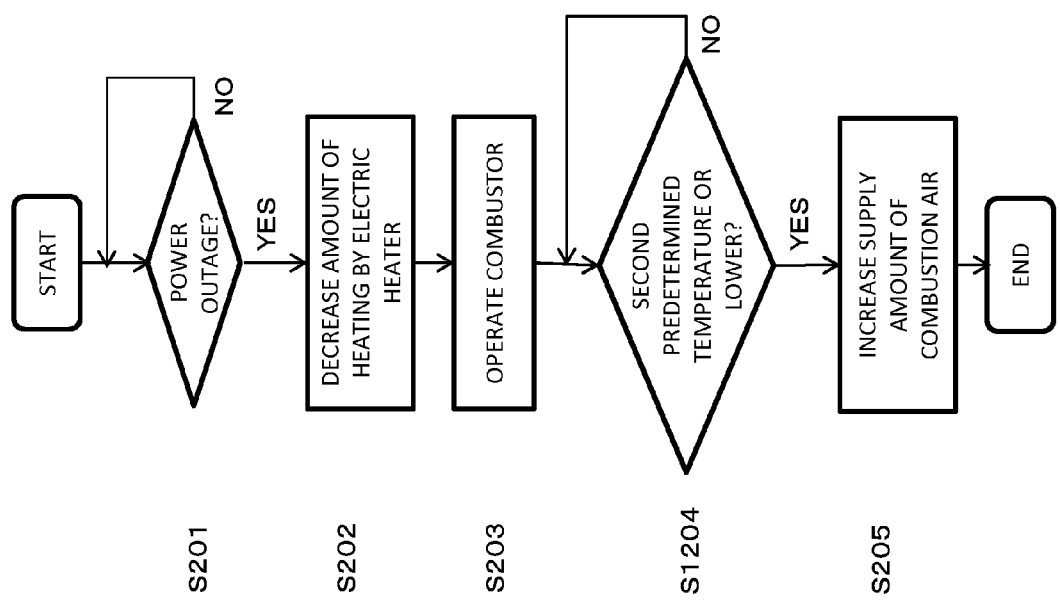
FIG. 12 is a flowchart showing an example of the start-up step performed by a fuel cell system according to Variation 2 of Embodiment 2 of the present invention in the power outage state.

FIG. 12 is a flowchart showing an example of the start-up step performed by the fuel cell system 100 according to Variation 2 of Embodiment 2 in the power outage state. The temperatures of the shift conversion catalyst and selective oxidation catalyst positioned at the downstream side of the flue gas flow passage are less easily increased than the temperature of the reforming catalyst positioned at the upstream side of the flue gas flow passage. For this reason, as shown in FIG. 12, the controller 10 determines whether or not a second detected temperature detected by the second temperature detector 49 is lower than or equal to a second predetermined temperature (step S1204). The second predetermined temperature is in advance set to a suitable temperature for the shift conversion catalyst, for example, 180 to 300° C., and preferably 200° C. Alternatively, the second predetermined temperature is in advance set to a suitable temperature for the selective oxidation catalyst, for example, 100 to 180° C., and preferably 170° C.

If the second detected temperature is lower than or equal to the second predetermined temperature (step S1204: YES), the controller 10 increases the supply amount of the combustion air to be greater than in the power supplied state (step S205). As a result, the amount and flow velocity of the flue gas are increased. This makes it possible to sufficiently heat the shift conversion catalyst and selective oxidation catalyst positioned at the downstream side of the flue gas flow passage while preventing overheating of the reforming catalyst positioned at the upstream side of the flue gas flow passage. Consequently, the temperatures of the catalysts in the fuel processor 41 can be adjusted to their respective suitable temperatures.

(Variation 3)

Figure 13:
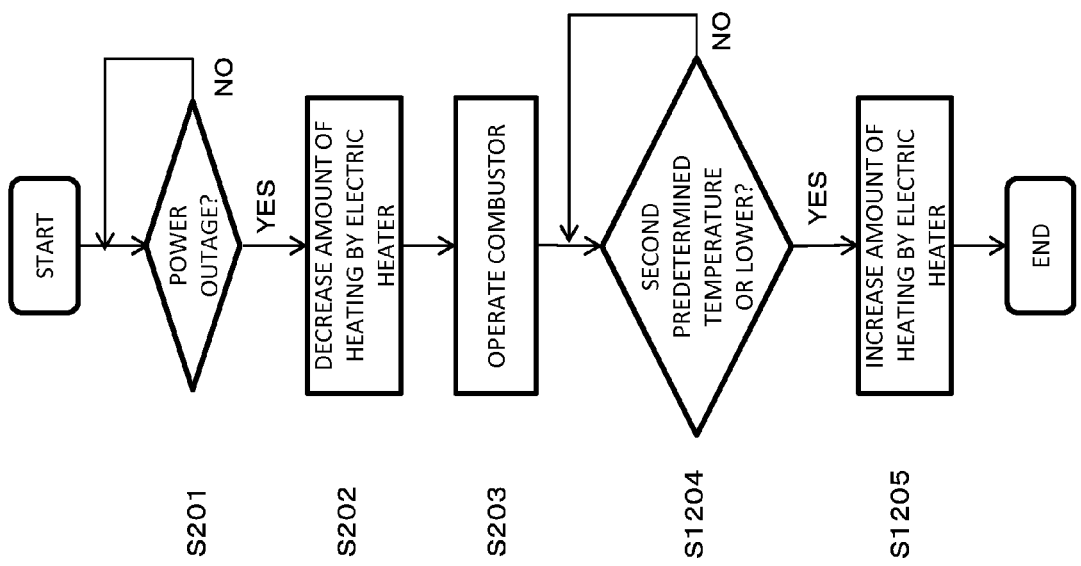
FIG. 13 is a flowchart showing an example of the start-up step performed by a fuel cell system according to Variation 3 of Embodiment 2 of the present invention in the power outage state.

FIG. 13 is a flowchart showing an example of the start-up step performed by the fuel cell system 100 according to Variation 3 of Embodiment 2 in the power outage state. As shown in FIG. 13, if the second detected temperature is lower than or equal to the second predetermined temperature (step S1204: YES), it means that increase in the temperatures of the shift conversion catalyst and the selective oxidation catalyst is slower than increase in the temperature of the reforming catalyst. Accordingly, the controller 10 increases the amount of heating by the electric heater 50 (step S1205). As a result, the temperatures of the shift conversion catalyst and the selective oxidation catalyst are increased. In this manner, the temperatures of the catalysts in the fuel processor 41 can be adjusted to their respective suitable temperatures.

(Variation 4)

Figure 14:
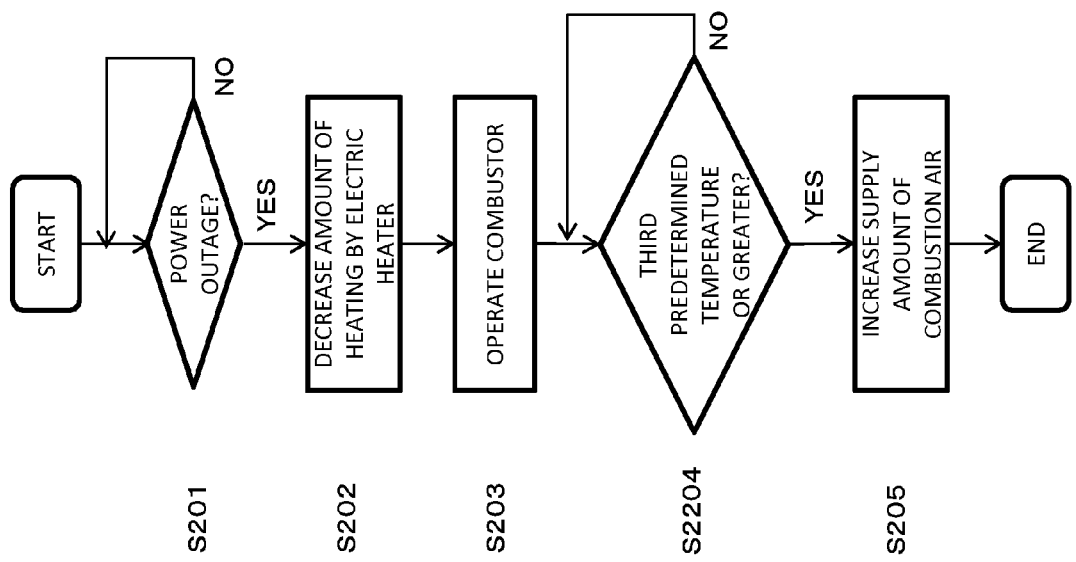
FIG. 14 is a flowchart showing an example of the start-up step performed by a fuel cell system according to Variation 4 of Embodiment 2 of the present invention in the power outage state.

FIG. 14 is a flowchart showing an example of the start-up step performed by the fuel cell system 100 according to Variation 4 of Embodiment 2 in the power outage state. As shown in FIG. 14, the controller 10 determines whether or not the first detected temperature is higher than the second detected temperature and a difference between the first detected temperature and the second detected temperature is greater than or equal to a third predetermined temperature (step S2204). The third predetermined temperature is a difference between a suitable temperature for the reforming catalyst and a suitable temperature for the shift conversion catalyst or the selective oxidation catalyst.

If the first detected temperature is higher than the second detected temperature and the difference between the first detected temperature and the second detected temperature is greater than or equal to the third predetermined temperature (step S2204: YES), it means that the temperature of the reforming catalyst is much higher than the temperatures of the shift conversion catalyst and the selective oxidation catalyst. Therefore, the controller 10 increases the supply amount of the combustion air to be greater than in the power supplied state (step S205), thereby increasing the amount and flow velocity of the flue gas. This makes it possible to sufficiently heat the shift conversion catalyst and selective oxidation catalyst positioned at the downstream side of the flue gas flow passage while preventing overheating of the reforming catalyst positioned at the upstream side of the flue gas flow passage. As a result, the temperatures of the catalysts in the fuel processor 41 can be adjusted to their respective suitable temperatures.

(Variation 5)

Figure 15:
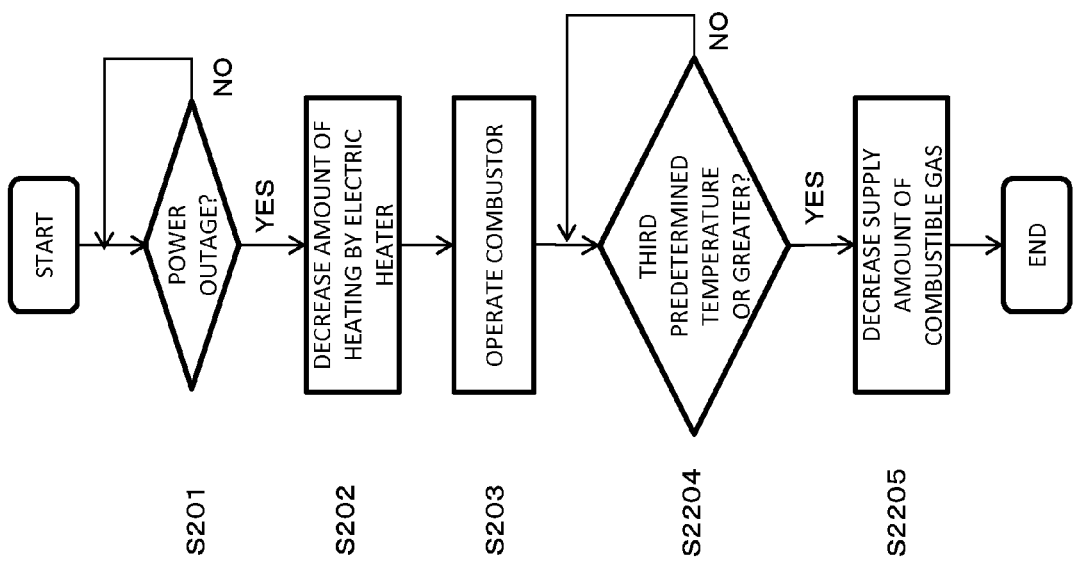
FIG. 15 is a flowchart showing an example of the start-up step performed by a fuel cell system according to Variation 5 of Embodiment 2 of the present invention in the power outage state.

FIG. 15 is a flowchart showing an example of the start-up step performed by the fuel cell system 100 according to Variation 5 of Embodiment 2 in the power outage state. As shown in FIG. 15, if the first detected temperature is higher than the second detected temperature and the difference between the first detected temperature and the second detected temperature is greater than or equal to the third predetermined temperature (step S2204: YES), the controller 10 decreases the supply amount of the combustible gas to be less than in the power supplied state (step S2205). As a result, the temperature of the flue gas decreases. This makes it possible to heat the shift conversion catalyst and selective oxidation catalyst positioned at the downstream side of the flue gas flow passage while preventing overheating of the reforming catalyst positioned at the upstream side of the flue gas flow passage. Consequently, the temperatures of the catalysts in the fuel processor 41 can be adjusted to their respective suitable temperatures.

(Variation 6)

Figure 16:
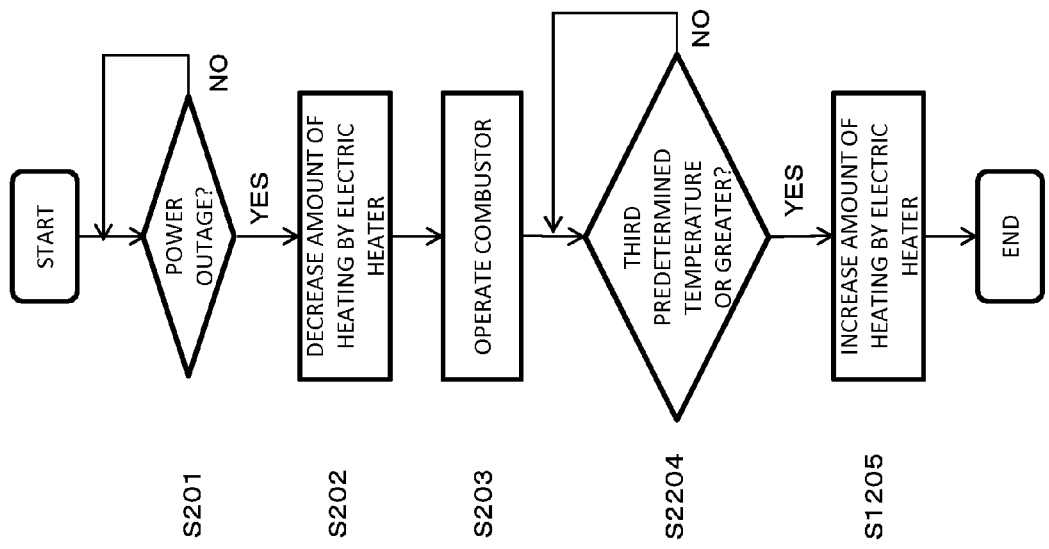
FIG. 16 is a flowchart showing an example of the start-up step performed by a fuel cell system according to Variation 6 of Embodiment 2 of the present invention in the power outage state.

FIG. 16 is a flowchart showing an example of the start-up step performed by the fuel cell system 100 according to Variation 6 of Embodiment 2 in the power outage state. As shown in FIG. 16, if the first detected temperature is higher than the second detected temperature and the difference between the first detected temperature and the second detected temperature is greater than or equal to the third predetermined temperature (step S2204: YES), the controller 10 increases the amount of heating by the electric heater 50 (step S1205). As a result, the temperatures of the shift conversion catalyst and the selective oxidation catalyst are increased, and thus the temperatures of the catalysts in the fuel processor 41 can be adjusted to their respective suitable temperatures.

Embodiment 3

Figure 17:
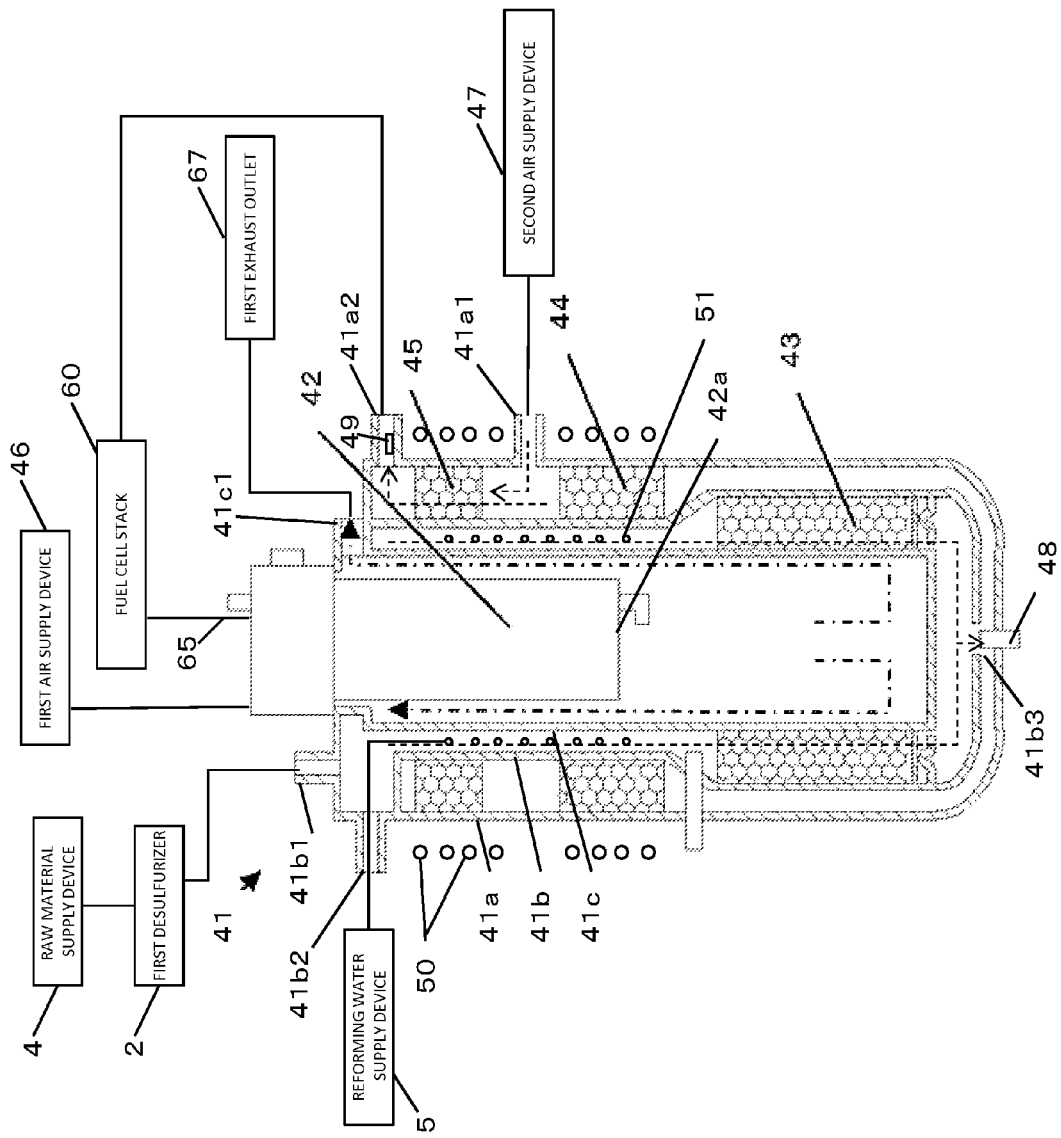
FIG. 17 is a cross-sectional view showing a fuel processor used in a fuel cell system according to Embodiment 3 of the present invention.

FIG. 17 is a cross-sectional view showing the fuel processor 41 used in the fuel cell system 100 according to Embodiment 3. As shown in FIG. 17, the fuel processor 41 further includes an evaporator 51 configured to exchange heat with the CO reducers (shift converter 44, selective oxidizer 45) and generate steam from the reforming water. The evaporator 51 is a spiral rod. The reforming water supply device 5 is connected to the end of the rod. A reforming water passage is formed between adjacent portions of the rod. The evaporator 51 is disposed in the evaporation space positioned in the upper part of the inner gas flow passage between the outer cylinder 41b and the inner cylinder 41c. The reforming water supplied from the reforming water supply device 5 becomes steam by being heated by the flue gas while flowing through the evaporator 51. The steam is mixed with the raw material gas supplied from the raw material supply device 4, and the mixture of the steam and raw material gas flows into the reformer 43 where a fuel gas is generated.

Figure 18:
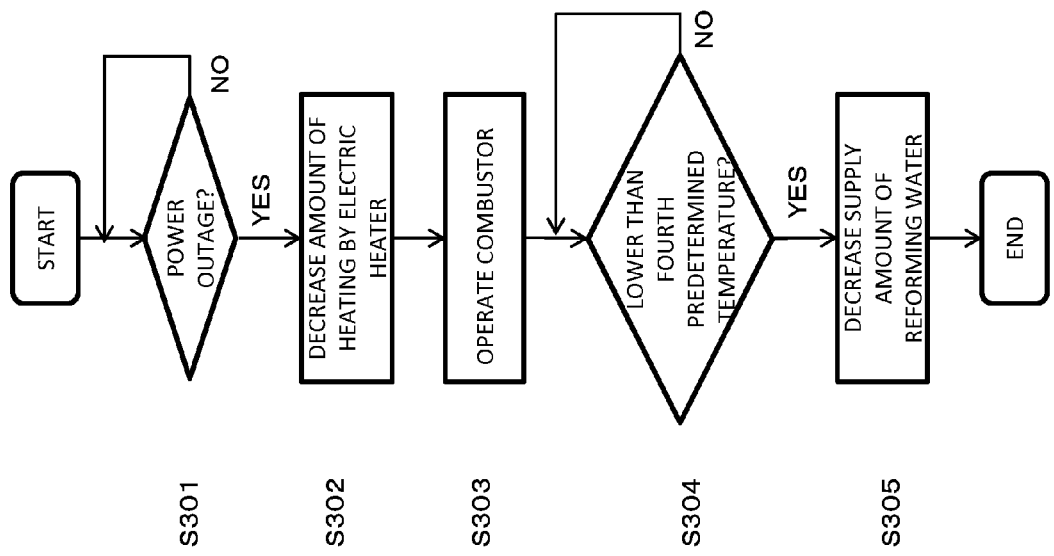
FIG. 18 is a flowchart showing an example of the start-up step performed by the fuel cell system of FIG. 17 in the power outage state.

FIG. 18 is a flowchart showing an example of the start-up step performed by the fuel cell system 100 in the power outage state. It should be noted that processes in steps S301 to S303 of FIG. 18 are the same as the processes in steps S101 to S103 of FIG. 6, respectively. Therefore, the processes in steps S301 to S303 will be described briefly.

As shown in FIG. 18, in the power outage state (step S301: YES), the controller 10 decreases the amount of heating by the electric heater 50 to be less than in the power supplied state (step S302). Then, the controller 10 operates the combustor 42 while increasing the amount of combustion air supplied to the combustor 42 to be greater than in the power supplied state or decreasing the amount of combustible gas supplied to the combustor 42 to be less than in the power supplied state (step S303). The catalysts are heated by the flue gas heated by the combustor 42. In this case, however, the temperatures of the shift conversion catalyst and selective oxidation catalyst positioned at the downstream side of the flue gas flow passage are less easily increased than the temperature of the reforming catalyst positioned at the upstream side of the flue gas flow passage. In particular, since the evaporator 51 is positioned closer to the flue gas flow passage than the shift conversion catalyst and the selective oxidation catalyst, the heat from the flue gas is taken by the reforming water in the evaporator 51. For this reason, the controller 10 determines whether the second detected temperature detected by the second temperature detector 49 is lower than a fourth predetermined temperature (step S304). The fourth predetermined temperature is in advance set to a suitable temperature for the shift conversion catalyst, for example, 180 to 300° C., and preferably 200° C. Alternatively, the fourth predetermined temperature is in advance set to a suitable temperature for the selective oxidation catalyst, for example, 100 to 180° C., and preferably 170° C.

If the second detected temperature is lower than the fourth predetermined temperature (step S304: YES), the controller 10 decreases the supply amount of the reforming water to be less than in the power supplied state (step S305). Accordingly, the amount of heat of the flue gas, the heat being used to evaporate the reforming water, decreases, and thereby the shift conversion catalyst and the selective oxidation catalyst receive a larger amount of heat from the flue gas. As a result, the temperatures of the shift conversion catalyst and the selective oxidation catalyst are increased, and thus the temperatures of the catalysts in the fuel processor 41 can be adjusted to their respective suitable temperatures.

It should be noted that if the second detected temperature reaches the fourth predetermined temperature or a predetermined temperature lower than the fourth predetermined temperature, the previously decreased supply amount of the reforming water may be brought back to the same level as in the power supplied state.

(Variation 1)

Figure 19:
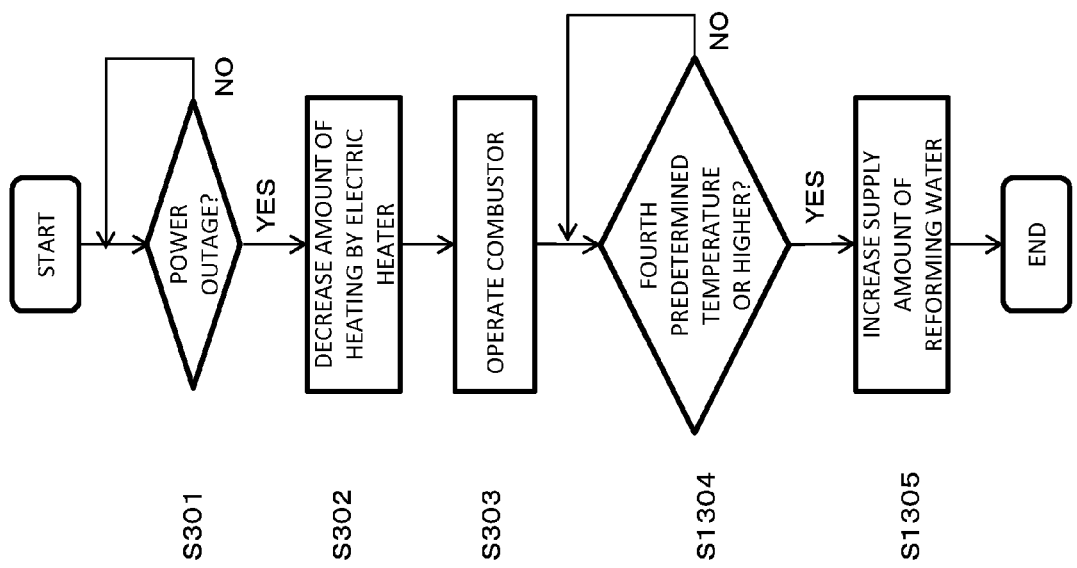
FIG. 19 is a flowchart showing an example of the start-up step performed by a fuel cell system according to Variation 1 of Embodiment 3 of the present invention in the power outage state.

FIG. 19 is a flowchart showing an example of the start-up step performed by the fuel cell system 100 according to Variation 1 of Embodiment 3 in the power outage state. As shown in FIG. 19, if the second detected temperature is higher than or equal to the fourth predetermined temperature (step S1304: YES), it means that the temperatures of the shift conversion catalyst and the selective oxidation catalyst are high. Accordingly, the controller 10 increases the supply amount of the reforming water (step S1305). As a result, heat is taken by the reforming water from the flue gas, the shift conversion catalyst, and the selective oxidation catalyst. Consequently, the temperatures of the shift conversion catalyst and the selective oxidation catalyst are lowered, and the temperatures of the catalysts are adjusted to their respective suitable temperatures. This allows the fuel processor 41 to generate a fuel gas with reduced carbon monoxide content.

(Variation 2)

Figure 20:
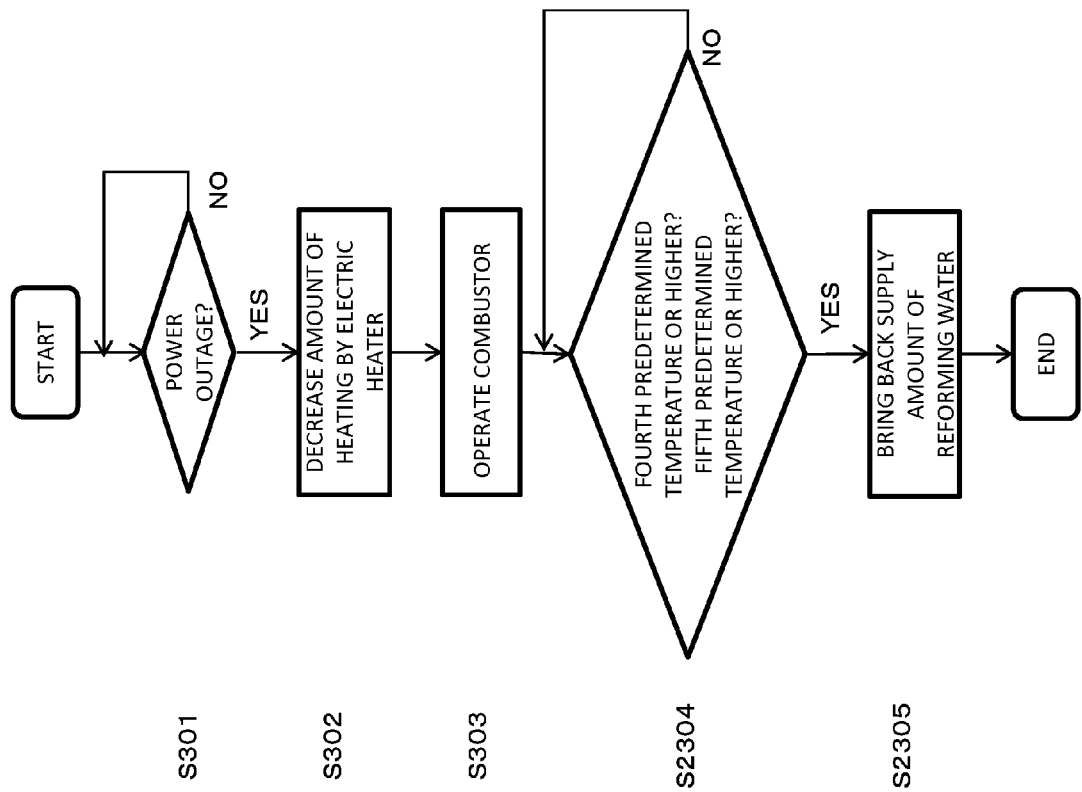
FIG. 20 is a flowchart showing an example of the start-up step performed by a fuel cell system according to Variation 2 of Embodiment 2 of the present invention in the power outage state.

FIG. 20 is a flowchart showing an example of the start-up step performed by the fuel cell system 100 according to Variation 2 of Embodiment 3 in the power outage state. As shown in FIG. 20, the controller 10 determines whether or not the second detected temperature is higher than or equal to the fourth predetermined temperature, and the first detected temperature is higher than or equal to a fifth predetermined temperature (step S2304). The fifth predetermined temperature is in advance set to a suitable temperature for the reforming catalyst, for example, 550° C. or higher, and preferably 600 to 650° C.

If the second detected temperature is higher than or equal to the fourth predetermined temperature and the first detected temperature is higher than or equal to the fifth predetermined temperature (step S2304: YES), it means that the temperatures of the respective catalysts in the fuel processor 41 are suitable temperatures. For this reason, the controller 10 brings the supply amount of the reforming water back to the same level as in the power supplied state (step S2305). In this manner, the temperatures of the catalysts are adjusted to their respective suitable temperatures. This allows the fuel processor 41 to generate a fuel gas with reduced carbon monoxide content.

Embodiment 4

Figure 21:
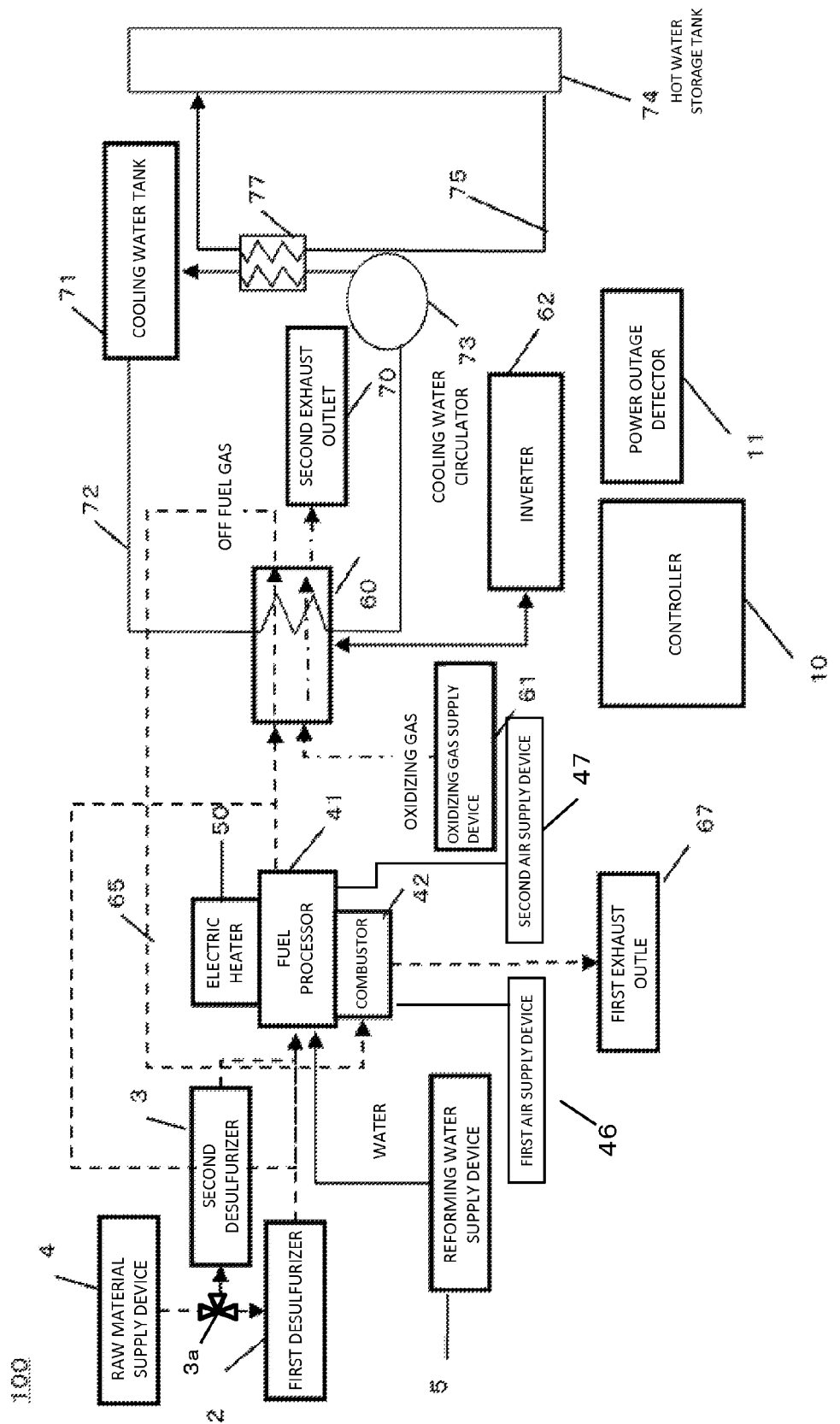
FIG. 21 is a block diagram showing a configuration of the fuel cell system according to Embodiment 3 of the present invention.

FIG. 21 is a cross-sectional view showing the fuel processor 41 used in the fuel cell system 100 according to Embodiment 4. As shown in FIG. 21, the fuel processor 41 further includes a second desulfurizer 3 in addition to the first desulfurizer 2. The first desulfurizer 2 is an adsorption desulfurizer configured to adsorb sulfur contained in the raw material without reacting the sulfur with hydrogen, thereby removing the sulfur from the raw material. The second desulfurizer 3 accommodates a hydrodesulfurization catalyst, and is a hydrodesulfurizer configured to adsorb sulfur contained in the raw material after reacting the sulfur with hydrogen, thereby removing the sulfur from the raw material gas. The second desulfurizer 3 is disposed around the reformer 43 of the fuel processor 41, and is heated by the high-temperature reformer 43. Moreover, the electric heater 50 is disposed around the second desulfurizer 3. Thus, the second desulfurizer 3 is also heated by the electric heater 50. It should be noted that, other than the electric heater 50 configured to heat the shift converter 44 and the selective oxidizer 45, an electric heater configured to heat the second desulfurizer 3 may be additionally provided.

The second desulfurizer 3 is connected via a bypass passage to the raw material supply passage connecting the raw material supply device 4 and the fuel processor 41, such that the second desulfurizer 3 is positioned parallel to the first desulfurizer 2. A switch 3a configured as a three-way valve is provided at a connection between the bypass passage and the raw material supply passage. The switch 3a switches the destination of the raw material gas supplied from the raw material supply device 4 between the first desulfurizer 2 and the second desulfurizer 3.

In the power outage state, the controller 10 controls the switch 3a to increase the proportion of the amount of sulfur removed by the first desulfurizer 2 to the amount of sulfur removed by the second desulfurizer 3 as compared to the proportion in the power supplied state. This eliminates the necessity of heating the second desulfurizer 3 with the electric heater 50, and thus electric power consumption at the start-up can be reduced. Since heat from the high-temperature reformer 43 is transmitted to the second desulfurizer 3, overheating of the reformer 43 is prevented and the temperatures of the catalysts in the fuel processor 41 can be adjusted to their respective suitable temperatures. Moreover, the high-temperature reformer 43 heats the second desulfurizer 3, and thereby the temperature of the catalyst in the second desulfurizer 3 can be adjusted to a suitable temperature.

(Other Variations)

The fuel processor 41 is required to be configured such that the flue gas generated through the combustion by the combustor 42 heats the CO reducers 44 and 45 after heating the reformer 43. As one example, partitions may be installed in a box-like container, and the reforming catalyst, the shift conversion catalyst, and the selective oxidation catalyst may be separately disposed in respective spaces divided by the partitions.

It should be noted that any of the above-described embodiments may be combined with each other, so long as the combined embodiments do not contradict with each other.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The fuel cell system according to the present invention is useful, for example, as a fuel cell system capable of reducing electric power consumption at start-up during a power outage while suppressing degradation of components and increase in costs.

REFERENCE SIGNS LIST 2 first desulfurizer
3 second desulfurizer
5 reforming water supply device
10 controller
11 power outage detector
14 electrical load
15 system power supply
41 fuel processor
42 combustor
43 reformer
44 shift converter (CO reducer)
45 selective oxidizer (CO reducer)
46 first air supply device
47 second air supply device
48 first temperature detector
49 second temperature detector
50 electric heater
51 evaporator
60 fuel cell stack (fuel cell)
61 oxidizing gas supply device
100 fuel cell system
200 power supply device

The invention claimed is:

1. A fuel cell system interconnected to a system power supply, the fuel cell system comprising:
a fuel cell configured to generate electric power by causing a reaction between a fuel gas containing hydrogen and an oxidizing gas;
a fuel processor including a reformer and a CO reducer, the reformer being configured to generate the fuel gas by causing a reaction between a raw material containing a hydrocarbon component and reforming water, the CO reducer being configured to reduce carbon monoxide in the fuel gas;
a combustor configured to heat the fuel processor by combusting a combustible gas supplied to the combustor;
a first air supply device configured to supply combustion air to the combustor;
an electric heater configured to heat the CO reducer;
a power supply device configured to supply electric power to the electric heater;
a controller; and
a power outage detector configured to detect a power outage in which no electric power is supplied from the system power supply to the fuel cell system, the power outage detector outputting power outage information indicative of a power outage state to the controller;
wherein
the controller is programmed to determine that a current state is the power outage state when the controller receives an input of the power outage information from the power outage detector before the fuel cell generates electric power,
in the power outage state,
the controller is programmed to at least one of: increasing a supply amount of the combustion air to be greater than in a power supplied state where the power outage detector does not detect the power outage; and decreasing a supply amount of the combustible gas to be less than in the power supplied state, and decreases an amount of heating by the electric heater to be less than in the power supplied state in a start-up step at the beginning and during start up.

2. The fuel cell system according to claim 1, further comprising:
a first temperature detector configured to detect a temperature of the reformer,
wherein the controller is programmed such that, if a first detected temperature detected by the first temperature detector is higher than or equal to a first predetermined temperature, the controller increases the supply amount of the combustion air or increases the amount of heating by the electric heater.

3. The fuel cell system according to claim 1, further comprising: a second temperature detector configured to detect a temperature of the CO reducer,
wherein the controller is programmed such that, if a second detected temperature detected by the second temperature detector is lower than or equal to a second predetermined temperature, the controller increases the supply amount of the combustion air or increases the amount of heating by the electric heater.

4. The fuel cell system according to claim 1, further comprising:
a first temperature detector configured to detect a temperature of the reformer; and
a second temperature detector configured to detect a temperature of the CO reducer,
wherein the controller is programmed such that, if a first detected temperature detected by the first temperature detector is higher than a second detected temperature detected by the second temperature detector, and a difference between the first detected temperature and the second detected temperature is greater than or equal to a third predetermined temperature, the controller performs at least one of: increasing the supply amount of the combustion air; decreasing the supply amount of the combustible gas; and increasing the amount of heating by the electric heater.

5. The fuel cell system according to claim 1, wherein the controller is programmed such that, if a time elapsed from when the combustor starts the combusting has reached a predetermined time, the controller increases the amount of heating by the electric heater.

6. The fuel cell system according to claim 1, further comprising:
a first temperature detector configured to detect a temperature of the reformer;
a second temperature detector configured to detect a temperature of the CO reducer; a water supply device configured to supply the reforming water to the fuel processor; and an evaporator configured to perform heat exchange with the CO reducer to generate steam from the reforming water, wherein
the controller is programmed such that, if a second detected temperature detected by the second temperature detector is lower than a fourth predetermined temperature, the controller decreases a supply amount of the reforming water to be less than in the power supplied state.

7. The fuel cell system according to claim 6, wherein the controller is programmed such that, if the second detected temperature is higher than or equal to the fourth predetermined temperature, the controller increases the supply amount of the reforming water.

8. The fuel cell system according to claim 6, wherein the controller is programmed such that, if the second detected temperature is higher than or equal to the fourth predetermined temperature and a first detected temperature detected by the first temperature detector is higher than or equal to a fifth predetermined temperature, the controller brings the supply amount of the reforming water back to the supply amount of the reforming water in the power supplied state.

9. The fuel cell system according to claim 1, wherein the CO reducer includes: a shift converter configured to reduce carbon monoxide by reacting the carbon monoxide with water; and a selective oxidizer configured to reduce carbon monoxide by reacting the carbon monoxide with oxygen,
the fuel cell system further comprising a second air supply device configured to supply air to the selective oxidizer, wherein
the controller is programmed to cause the second air supply device to supply air such that the air supplied to the selective oxidizer is in an amount greater than in the power supplied state.

10. The fuel cell system according to claim 1, further comprising:
a first desulfurizer configured to remove sulfur from the raw material without reacting the sulfur contained in the raw material with hydrogen; and
a second desulfurizer configured to remove sulfur from the raw material by reacting the sulfur contained in the raw material with hydrogen, wherein
the electric heater heats the CO reducer and the second desulfurizer, and the
controller is programmed to increase a proportion of an amount of the sulfur removed by the first desulfurizer to an amount of the sulfur removed by the second desulfurizer as compared to the proportion in the power supplied state.

11. The fuel cell system according to claim 1, wherein the fuel processor is configured such that a flue gas generated through the combusting by the combustor heats the CO reducer after heating the reformer.

* * * * *